US010409076B2

(12) United States Patent
Tremblay et al.

(10) Patent No.: US 10,409,076 B2
(45) Date of Patent: Sep. 10, 2019

(54) ADJUSTABLE PUPIL DISTANCE WEARABLE DISPLAY

(71) Applicant: North Inc., Kitchener (CA)

(72) Inventors: Eric Tremblay, Saint Sulpice (CH);
Nicolas Abele, Demoret (CH);
Alexandre Fotinos,
Chavannes-Pres-Renes (CH); Mickael Guillaumee, Neucha'tel (CH); David Ziegler, Lausanne (CH); Christophe Moser, Lausanne (CH); Philippe De Gol, Muraz (CH)

(73) Assignee: NORTH INC., Kitchener, ON (CA)

( * ) Notice: Subject to any disclaimer, the term of this patent is extended or adjusted under 35 U.S.C. 154(b) by 343 days.

(21) Appl. No.: 15/473,539

(22) Filed: Mar. 29, 2017

(65) Prior Publication Data

US 2017/0205630 A1    Jul. 20, 2017

Related U.S. Application Data

(63) Continuation-in-part of application No. 14/931,497, filed on Nov. 3, 2015.

(60) Provisional application No. 62/240,395, filed on Oct. 12, 2015.

(51) Int. Cl.
*G02B 27/01* (2006.01)
*G06F 3/01* (2006.01)

(52) U.S. Cl.
CPC ..... *G02B 27/0179* (2013.01); *G02B 27/0103* (2013.01); *G02B 27/0172* (2013.01); *G06F 3/013* (2013.01); *G02B 2027/014* (2013.01); *G02B 2027/0132* (2013.01); *G02B 2027/0156* (2013.01); *G02B 2027/0174* (2013.01); *G02B 2027/0178* (2013.01); *G02B 2027/0185* (2013.01); *G02B 2027/0187* (2013.01); *G02B 2027/0194* (2013.01)

(58) Field of Classification Search
CPC .... G02B 27/01–0189; G02B 2027/0105–0198
See application file for complete search history.

(56) References Cited

U.S. PATENT DOCUMENTS

| | | | | |
|---|---|---|---|---|
| 5,255,065 A | * | 10/1993 | Schwemmer | ......... G01S 7/4811 356/4.01 |
| 7,190,518 B1 | * | 3/2007 | Kleinberger | ....... G02B 27/0093 359/465 |
| 9,846,307 B2 | * | 12/2017 | Tremblay | ................ G02B 26/10 |
| 9,870,049 B2 | * | 1/2018 | Raffle | ....................... G06F 3/013 |
| 9,880,441 B1 | * | 1/2018 | Osterhout | ............... G02F 1/153 |
| 10,001,647 B2 | * | 6/2018 | Han | ..................... G02B 27/017 |

(Continued)

FOREIGN PATENT DOCUMENTS

WO    WO-2014155288 A2 *    10/2014    ......... G02B 27/0172

*Primary Examiner* — Patrick F Marinelli
(74) *Attorney, Agent, or Firm* — Thomas Mahon

(57) ABSTRACT

A head worn display (HWD) includes a projection system, which projection system in turn may include: a projection surface including a holographic optical element (HOE) centered at a first location; a projector to project light onto a projection area of the projection surface; and a controller to send a control signal to the projector to cause the projector to project an image onto a location shifted from the first location based on a misalignment of a user's line of sight with the first location.

23 Claims, 26 Drawing Sheets

(56) References Cited

U.S. PATENT DOCUMENTS

| | | | |
|---|---|---|---|
| 10,031,579 B2* | 7/2018 | Raffle | G06F 3/013 |
| 10,133,071 B2* | 11/2018 | Wade | G02B 27/0103 |
| 10,175,488 B2* | 1/2019 | Bailey | G02B 27/0172 |
| 10,197,805 B2* | 2/2019 | Bailey | G02B 27/0172 |
| 10,254,547 B2* | 4/2019 | Tremblay | G02B 27/0172 |
| 2002/0071472 A1* | 6/2002 | Dickson | G02B 5/32 372/102 |
| 2002/0180659 A1* | 12/2002 | Takahashi | G02B 27/225 345/4 |
| 2005/0007639 A1* | 1/2005 | Natarajan | G02B 5/32 359/15 |
| 2008/0186502 A1* | 8/2008 | Studer | G01B 11/105 356/450 |
| 2013/0009853 A1* | 1/2013 | Hesselink | G02B 27/017 345/8 |
| 2013/0083003 A1* | 4/2013 | Perez | G06F 3/005 345/419 |
| 2013/0342570 A1* | 12/2013 | Kinnebrew | G09G 3/003 345/633 |
| 2014/0002442 A1* | 1/2014 | Lamb | G06F 3/1431 345/419 |
| 2014/0111838 A1* | 4/2014 | Han | G02B 27/017 359/13 |
| 2015/0036221 A1* | 2/2015 | Stephenson | G02B 27/0101 359/630 |
| 2016/0033771 A1* | 2/2016 | Tremblay | G02B 26/10 345/8 |
| 2016/0209654 A1* | 7/2016 | Riccomini | G02B 27/0172 |
| 2016/0238845 A1* | 8/2016 | Alexander | G03H 1/2645 |
| 2016/0327796 A1* | 11/2016 | Bailey | G02B 27/0172 |
| 2016/0349514 A1* | 12/2016 | Alexander | G06F 3/013 |
| 2016/0349515 A1* | 12/2016 | Alexander | G06F 3/013 |
| 2016/0349516 A1* | 12/2016 | Alexander | G06F 3/013 |
| 2017/0031435 A1* | 2/2017 | Raffle | G06F 3/013 |
| 2017/0068095 A1* | 3/2017 | Holland | B29D 11/00317 |
| 2017/0102548 A1* | 4/2017 | Tremblay | G02B 27/0172 |
| 2017/0205630 A1* | 7/2017 | Tremblay | G02B 27/0103 |
| 2017/0212349 A1* | 7/2017 | Bailey | G02B 27/0172 |
| 2017/0219829 A1* | 8/2017 | Bailey | G02B 27/0172 |
| 2017/0235144 A1* | 8/2017 | Piskunov | G02B 27/0081 359/13 |
| 2017/0293147 A1* | 10/2017 | Tremblay | G02B 26/10 |
| 2018/0003973 A1* | 1/2018 | Wade | B29C 45/14 |
| 2018/0003974 A1* | 1/2018 | Wade | G03H 1/0256 |
| 2018/0003976 A1* | 1/2018 | Wade | G02B 27/0172 |
| 2018/0088328 A1* | 3/2018 | Wade | G02B 27/0103 |
| 2018/0107273 A1* | 4/2018 | Raffle | G06F 3/013 |
| 2018/0164592 A1* | 6/2018 | Lopes | G02B 27/00 |
| 2018/0182272 A1* | 6/2018 | McGlew | G09G 3/002 |
| 2018/0364482 A1* | 12/2018 | Georgiou | G02B 27/0172 |
| 2019/0041565 A1* | 2/2019 | Masson | G02B 5/32 |

* cited by examiner

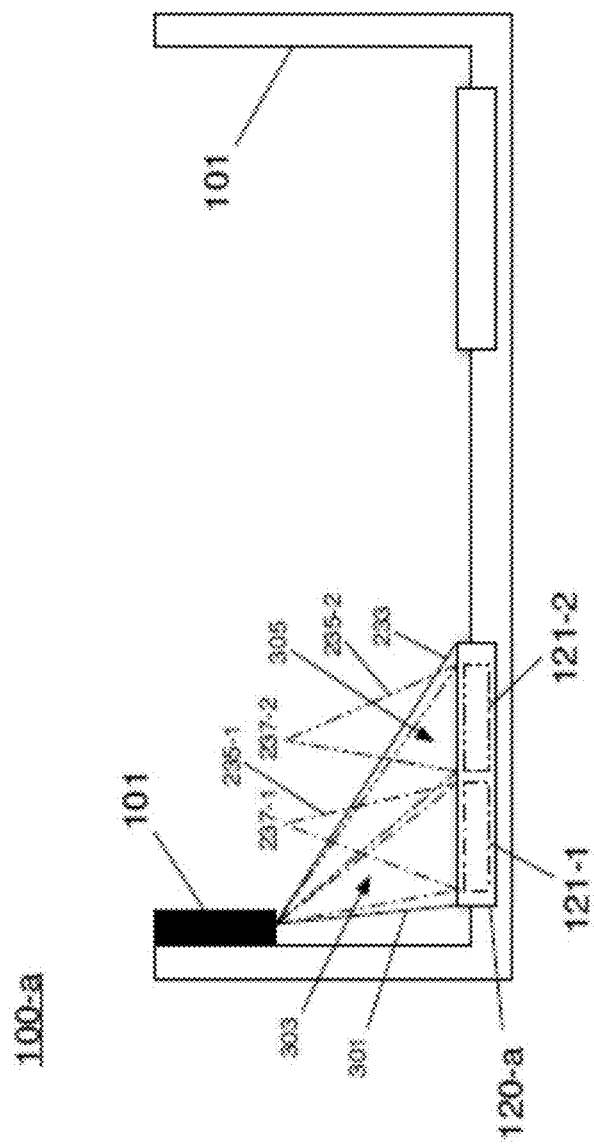

1000

Project an object beam and a reference beam to interfere with each other to form an HOE having a center in a first position of the lens.
1010

Displace at least one of the reference beam, the object beam, or the lens to change the position of the center along a horizontal direction of the lens.
1020

FIG. 10

ADJUSTABLE PUPIL DISTANCE WEARABLE DISPLAY

RELATED APPLICATIONS

This application is a continuation-in-part of U.S. application Ser. No. 14/931,497, filed Nov. 3, 2015, entitled "Adjustable Pupil Distance Wearable Display," which in turn claims the benefit of U.S. Provisional Application Ser. No. 62/240,395, filed Oct. 12, 2015, entitled "Adjustable Pupil Distance Wearable Display," both of which applications are incorporated herein by reference in their entirety.

TECHNICAL FIELD

Embodiments herein generally relate to head worn displays and heads up displays; and in particular to a wearable display to accommodate a range of pupil distances.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In particular, an image may be reflected off a transparent projection surface to a user's eye to present an image in conjunction with a real world view. Conventionally, HWD systems have extremely difficult tradeoffs between various design and utility considerations, such as, for example, bulk, form-factor, see-through quality, field of view, etc. For example, achieving a normal eyewear form factor without bulk has not been achieved in a commercial head mounted display.

Adding to the difficulty in designing and manufacturing commercial HWDs is the range over which different user's physiology (e.g., interpupillary distance (IPD), or the like) can vary.

BRIEF DESCRIPTION OF THE DRAWINGS

FIGS. 3A-3C illustrate example implementations of the first system.
FIG. 10 illustrates an example second logic flow.

DETAILED DESCRIPTION

Figure 2:
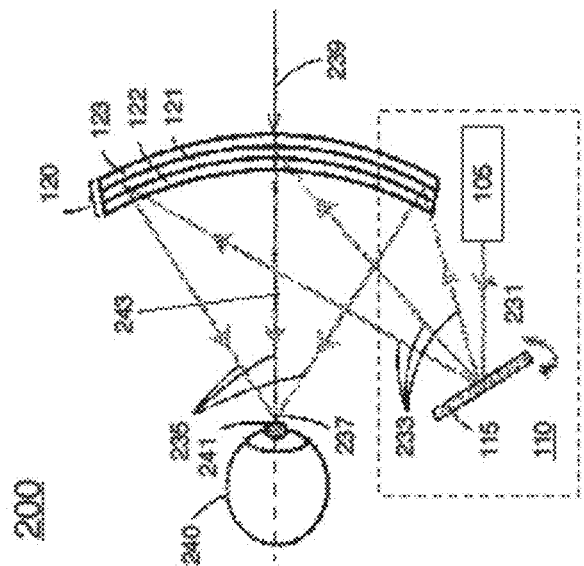
FIG. 2 illustrates an example second system.

Various embodiments may be generally directed to head worn displays (HWDs) and specifically to a HWD with interchangeable lenses. In general, HWDs provide a projection system and a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

It is to be appreciated that different user's may have different physiology, for example, a different interpupillary distance (IPD). More specifically, the distance between the eye pupils of one user may differ from that of another user. For example, two users with a different IPD may each wear a HWD (or similarly configured HWDs). The HWD may project an image to a lens with an HOE. The HOE may reflect the image to an exit pupil. When the HWD is worn by a first user, the exit pupil may be proximate to the first user's eye pupil. However, when the HWD is worn by a second user, the exit pupil may not be proximate to the second user's eye pupil as the second user has a different IPD than the first user (e.g., the second user's eyes are closer together than the first user's eyes, or the like). As such, the first user may correctly perceive the projected image but the second user may not.

It is noted, the configuration of the HOE affects the location of the exit pupil. More particularly, the location of the HOE in the lens and/or the optical characteristics of the HOE affect how and where the image is reflected. This is described in greater detail below. However, the present disclosure provides a HWD and lenses for a HWD with different HOEs. More specifically, the present disclosure provides a HWD configured to receive removable lenses. These removable lenses include an HOE. The HOE in one removable lens may be different (e.g., in a different location, with different optical characteristics, or the like) than the HOE in another removable lens to provide a HWD that can be provisioned for different IPDs.

Each of the HOEs in the removable lenses may be configured to reflect an image projected onto the HOE to an exit pupil in a particular location, where the exit pupil for one HOE may differ from the exit pupil of another HOE. For example, a first lens with a first HOE may be provided to reflect an image to a first exit pupil. A second lens with a second HOE may be provided to reflect the image to a second exit pupil. The first and second exit pupils may be displaced from each other, for example, in a horizontal direction. Accordingly, the HWD may be provisioned with either the first lens or the second lens to provide an exit pupil in either the first or second exit pupil location. As such, the HWD may be configured to provide an exit pupil (e.g., reflected image) in a first location for a first users with a first IPD (e.g., distance between pupils) or in a second location for a second user with a second IPD.

In some examples, the present disclosure provides a HWD frame with a fixed and/or integrated projection system and an interchangeable lens having an HOE configured to reflect an image to an exit pupil. The lens can be interchanged with another lens having another HOE, to provide for a different IPD value. With some examples, the projection system scans light over a projection surface (e.g., the lens) including an HOE to project an image onto the HOE. The lens including the HOE can be changed to account for a different IPD (e.g., an IPD of the intended user, or the like). The projection system can then be adjusted to project the image over the area corresponding to the changed HOE.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1:
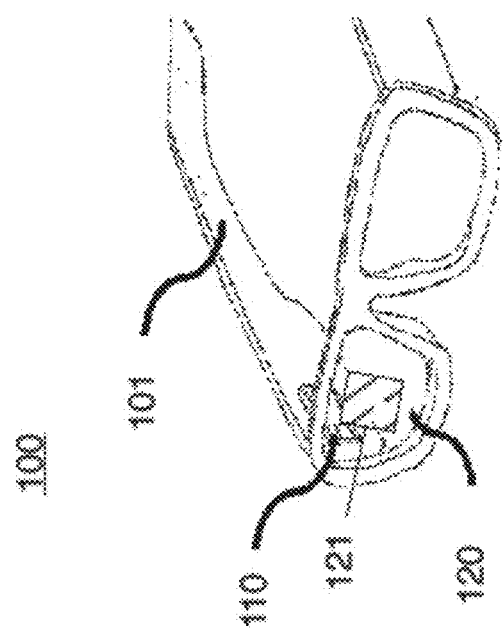
FIG. 1 illustrates an example first system.

FIG. 1 illustrates an example of device 100 arranged according to the present disclosure. It is noted, that the device of this figure is depicted implemented as a pair of glasses. However, with some examples, the device 100 may be embodied as a pair of glasses (e.g., as depicted), as a pair of binoculars, a monocular device (e.g., scope, or the like), as goggles, as a helmet, as a visor, as a wearable device, or the like. Embodiments are not limited in this context.

In general, the device 100 is configured to provide a virtual display. In some examples, the device 100 may provide a virtual display in conjunction with a real world view. The device 100 includes a glasses frame 101 and a projection system 110 mounted to the frame 101. Additionally, the device 100 includes a projection surface 120, which may be a lens, such as, for example, a glasses lens as depicted. For convenience and clarity in discussing present disclosure, the projection surface 120 is referenced as lens 120. However, embodiments are not limited in this context.

The lens 120 is removably mounted in the frame 101. The lens 120 includes an HOE 121 (also referred to as a holographic optical combiner). The HOE 121 may be in a particular location and/or have particular optical characteristics (e.g., refer to FIGS. 2 and 3A-3C) to selectively reflect light incident on the lens 120 to an exit pupil (e.g., the exit pupil 237 shown in FIG. 2).

During operation, the projection system 110 projects light onto the lens 120. The projected light can correspond to virtual images. The lens 120, and specifically the HOE 121, reflects (or redirects) the light towards a user's eye. More particularly the HOE 121 reflects the projected light (e.g., the projected image, or the like) to an exit pupil. This is described in greater detail with respect to FIG. 2. With some examples, the lens 120 and the HOE 121 redirect the projected images and also transmit light from the external environment to the user's eye. As such, a virtual image and a real world image may be presented to the user. It is noted, that although the device 100 is depicted with a single projection system 110 and lens 120, the device 100 may include a projection system 110 and lens 120 including an HOE 121 for each eye. Examples are not limited in this context. It is further noted, the device of this figure is implemented with lens 120. However, with some examples, the device 100 may be implemented with elements alternative to the lens 120. Additionally, examples discussed herein reference the lens 120, and particularly, the HOE 121 onto which images are projected.

With some examples, the projection system 110 may comprise a light source, battery, and projector to project images onto the HOE 121. For example, the projection system 110 may comprise a scanning mirror to reflect and redirect light from the light source onto the HOE 121. In some examples, the scanning mirror may be a microelectromechanical system (MEMS) based scanning mirror. In some examples, the projection system 110 may comprise a panel micro display (e.g., light emitting diode (LED) panel, liquid crystal display (LCD) panel, or the like). Additionally, the projection system 110 may include control and graphics processing components configured to cause the system 110 to emit light from the light source and to scan and/or project the emitted light onto the lens 120 to project an image onto the HOE 121.

The lens 120 is described in greater detail below, for example, with respect to FIG. 2. However, a general description of the lens 120 is given here. With some examples, the lens 120 is an at least partially transparent surface with the HOE 121 disposed in the lens 120. During operation, the lens 120 and the HOE 121 may transmit light incident on a real world side of the lens 120 to provide a real world view. In some examples, the lens 120 is opaque and the lens 120 does not transmit light incident on a real world side of the lens 120. The HOE 121 may be disposed in a particular location of the lens 120 and/or may have particular optical characteristics to reflect an image projected onto an internal surface of the lens 120 to an exit pupil in a particular location. With some examples, the lens 120 may be sunglass lenses to reduce an amount or type of light transmitted through the lenses, for example, by polarization or absorption. With some examples, the lenses 120 may be prescription lenses to correct or augment light perceived from the real world and/or the virtual image.

Figure 4A:
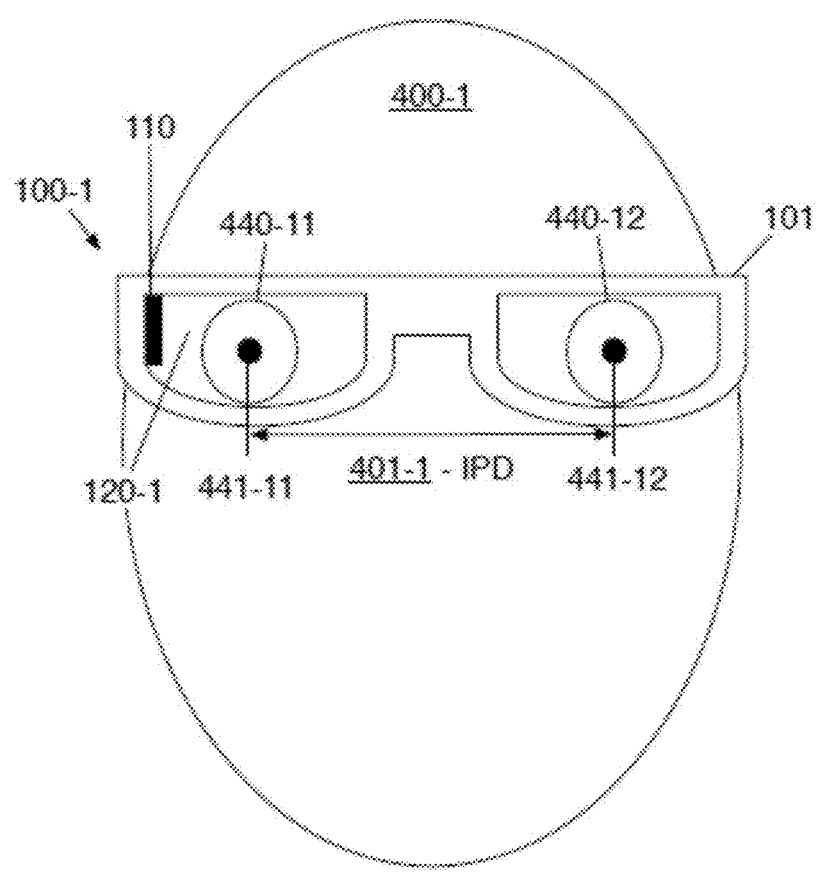
FIGS. 4A-4C illustrate example implementations of the first system.
Figure 4B:
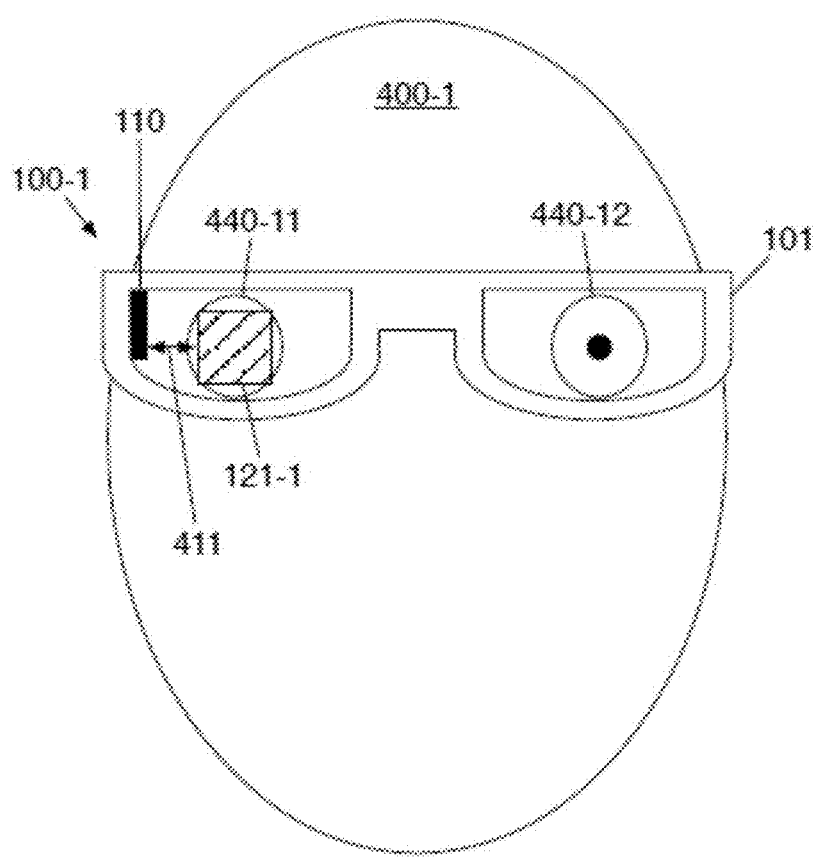
Figure 4C:
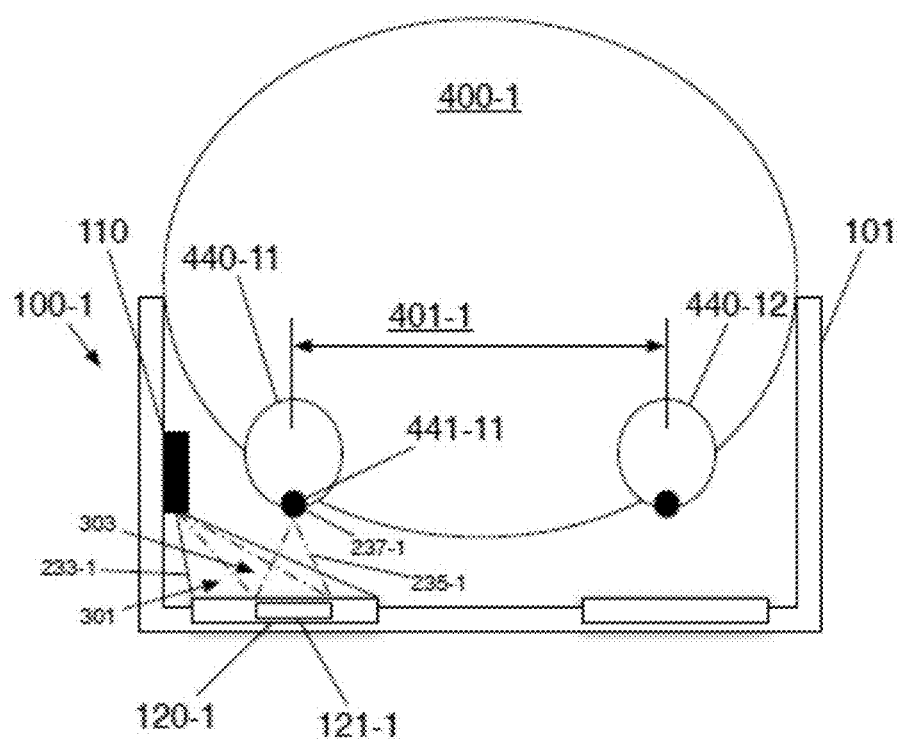
Figure 5A:
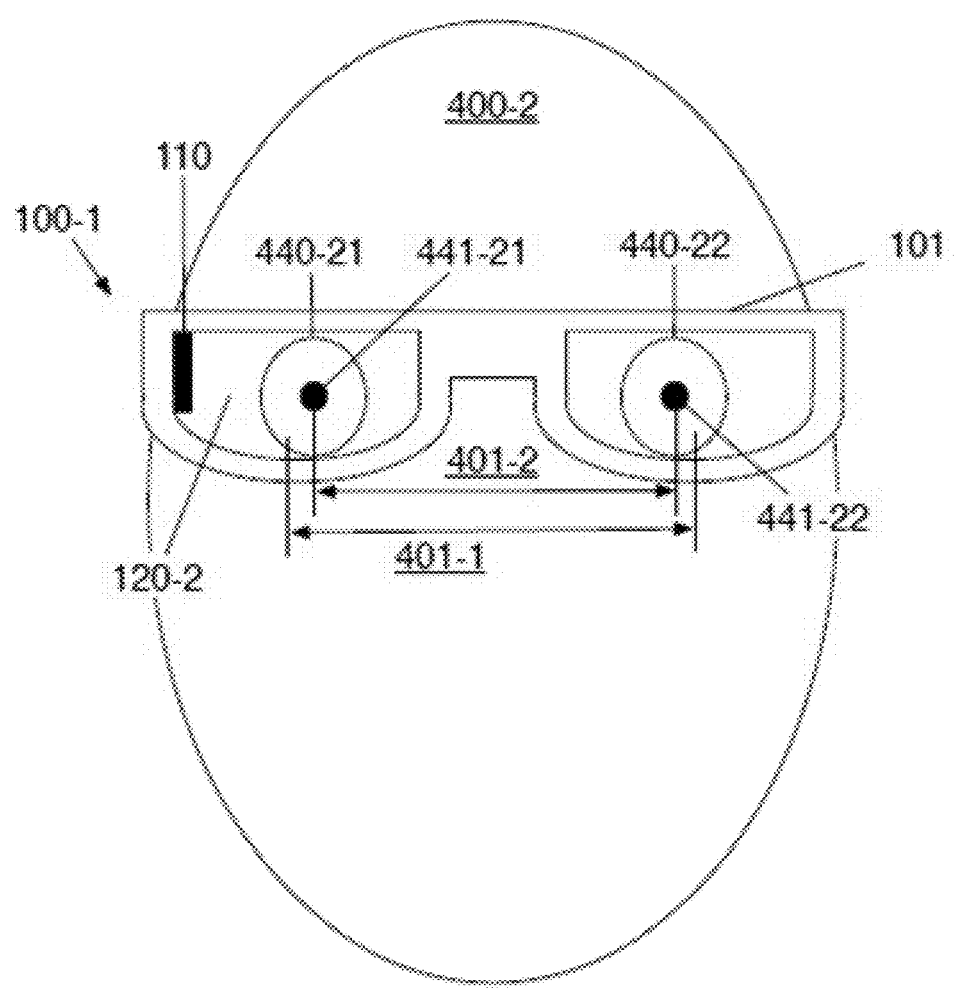
FIGS. 5A-5C illustrate example implementations of the first system.
Figure 5B:
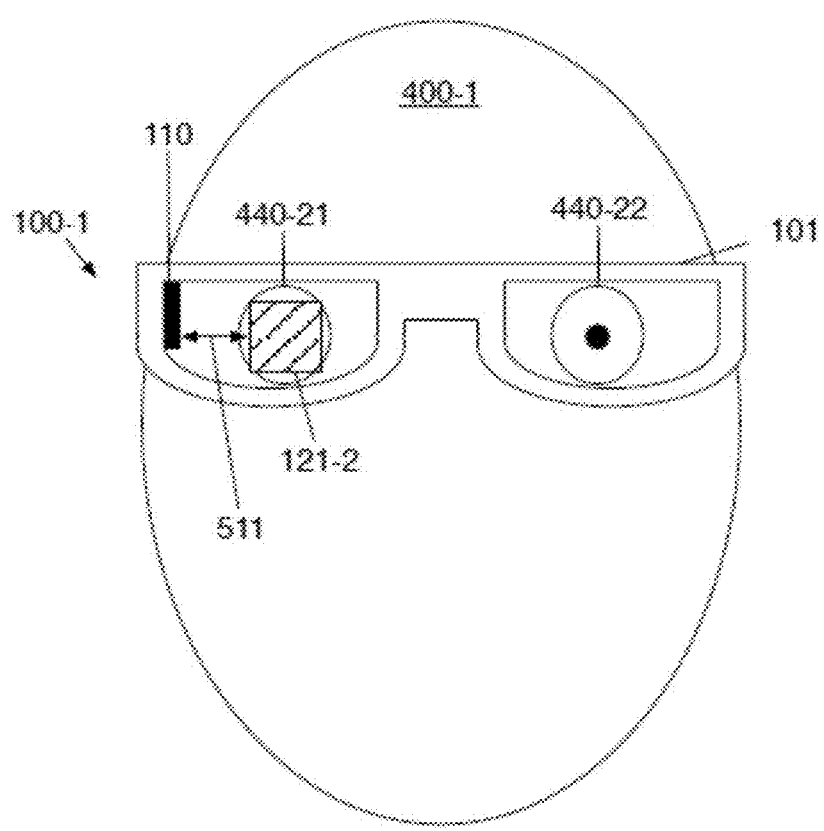
Figure 5C:
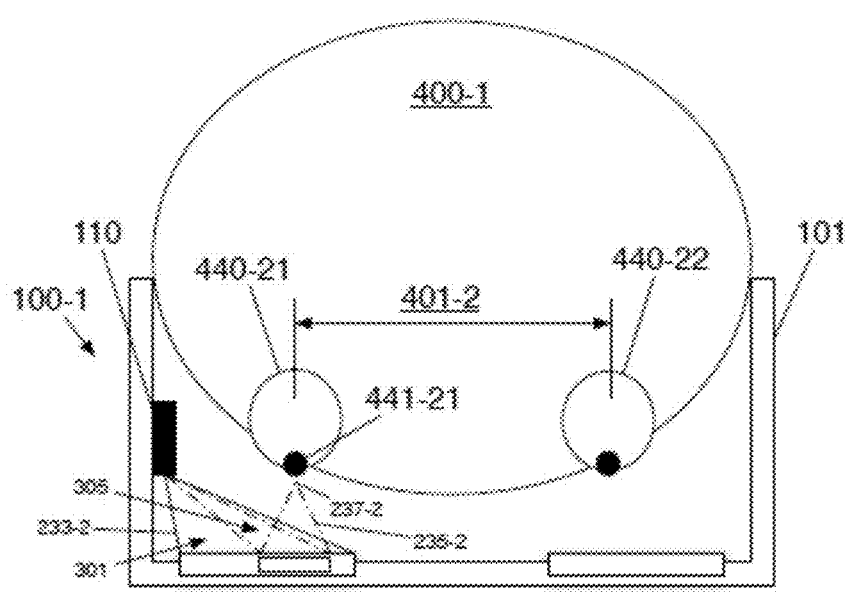

Any of a number of lenses, like the lens 120, each with an HOE 121 in a different location and/or with different optical characteristics may be removably coupled to the frame 101 to provide a virtual image or a combination of a virtual image and a real world view for different users, each with a different IPD. This is described in greater detail below, for example, with respect to FIGS. 4A-4C and FIGS. 5A-5C. However, in general, FIGS. 4A-4C depict the device 110 provisioned with a first lens 120-1 worn by a first user 400-1 while FIGS. 5A-5C depict the device 110 provisioned with a second lens 120-2 worn by a second user 400-2. It is noted, that the user 400-1 has a different IPD than the user 400-2 (e.g., the eyes of the user 400-2 are closer together than the eyes of the user 400-1). Each of the lenses 120-1 and 120-2 have an HOE configured to reflect a projected image for a specific IPD. Accordingly, as will be described in greater detail below: the device 100, provisioned with the lens 120-1, projects an image to an exit pupil for the user 400-1; and the device 100, provisioned with the lens 120-2, projects an image to an exit pupil for the user 400-2. Accordingly, the HOE 121 may be configured (e.g., positioned, optically tailored, or the like) for a particular IPD (e.g., an IPD of a user, or the like).

The positioning and/or optical characteristics of the HOE 121 and the relation to a user's IPD is described in greater detail below. However, the location or optical characteristics of the HOE 121 affect the exit pupil (e.g., viewpoint) of the virtual image reflected from the lens 120. As noted, the lens 120 including the HOE 121 may be removably disposed in the frame 101. Accordingly, a lens 120 with an HOE 121 corresponding to an IPD value (or corresponding to a range of IPDs, or the like) may be provided and/or coupled to the frame 101. As such, the device 100 may project a virtual image for the particular IPD (or range of IPDs). Additionally, a different lens with a differently configured HOE (e.g., corresponding to a different IPD value, or the like) may be provided and/or coupled to the frame 101. As such, the device 100 may project a virtual image for the different IPD value.

In some examples, the lens 120 may comprise a layer of holographic material coated onto one or both sides of the lens. For example, the lens 120 may comprise a photopolymer coated lens where the photopolymer is holographically recorded to form the HOE 121. As another example, the lens 120 may comprise a photopolymer layer disposed between two lens surfaces (e.g., protective layers, transparent layers, or the like). As noted, the holographic material acts to redirect the light projected from the projection system 110 into the eye while transmitting the light from the environment into the eye.

It is important to note, that the projection system 110 may not necessarily need to be mechanically adjusted and/or repositioned with respect to the lens 120. Instead, as will be described in greater detail below, the projection system 110 may be configured to project an image over an area of the lens 120 corresponding to the HOE 121 (e.g., the area 303 or the area 305 depicted in FIG. 3C, or the like) to project a virtual image to an exit pupil corresponding to the HOE 121.

For example, FIG. 2 is a block diagram illustrating a side view of a system 200 including an example implementation of the device 100. In general, the exemplary implementation of the device 100 depicted in this figure is configured to project light to a single exit pupil 237 (e.g., proximate to, or directed at, a user's eye, or the like). That is, the device 100 is configured to reflect the image projected onto the HOE 121 to a virtual aperture (e.g., the exit pupil 237) in the optical system. The system 200 includes the projection system 110 including a light source 105 to emit a light beam 231 of at least one wavelength. Alternatively, the system 110 may receive light emitted from a source not included in the system. Examples are not limited in this context. The light beam 231 is incident on (or received by) a scanning mirror 115. The scanning mirror 115 rotates about a number of axes to scan the light beam 231 in angles 233.

The scanning mirror 115 scans the light beam 231 in angles 233 onto (or across) the lens 120 while the system 110 modulates or modifies the intensity of the scanned light beam 231 to correspond to a digital image. In particular, the scanning mirror 115 scans the light beam 231 over an area of lens 120 while the system 110 projects a digital image onto a portion of the area that includes the HOE 121. This is explained in greater detail below, for example, with respect to FIGS. 3A-3C.

In some examples, the lens 120 comprises an HOE 121 disposed between two protective layers 122 and 123. It is noted, that a variety of styles of HOEs may be implemented as the HOE 121. Furthermore, the HOE 121 may be manufactured by any of variety of manufacturing techniques, such as, for example, recording a hologram into a medium. Examples are not limited in this context.

For example, the HOE 121 may be a combiner lens (e.g., a holographic optical combiner lens, or the like) that reflects light (e.g., off-angle light, or the like) incident on a first surface while transmitting light incident on a second opposite surface. Accordingly, the lens 120 reflects the light 233 as diffracted light 235 to an exit pupil 237. Thus, the lens 120 reflects and diffracts the light 233 to the entrance pupil 241 of a user's eye 240. Furthermore, the lens 120, and particularly the HOE 121, transmits light 239, which is incident on a front side of the lens 120 and HOE 121. As depicted, the line of sight 243 of the eye (e.g., corresponding to the eye pupil 241) is aligned with the exit pupil 237 and with the light 239. As such, the user may perceive a virtual image (e.g., as projected to exit pupil 237) in conjunction with a real world view (e.g., corresponding to light 239).

It is noted, that although only a single input pupil (e.g., light beam 231) and a single exit pupil (e.g., the exit pupil 237) are depicted, embodiments may be implemented to receive multiple input pupils and project an image with multiple exit pupils (e.g., based on a single input pupil or from multiple input pupils). Examples are not limited in this context.

Figure 3B:
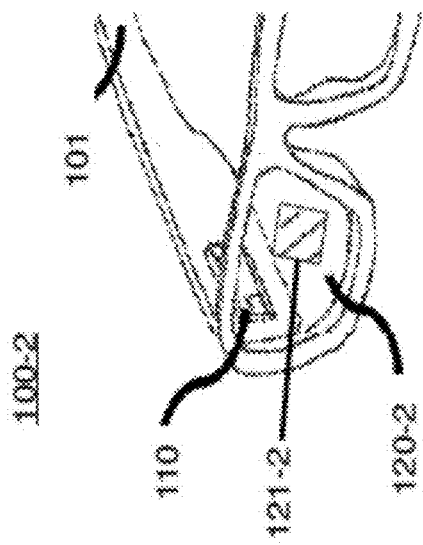
Figure 3A:
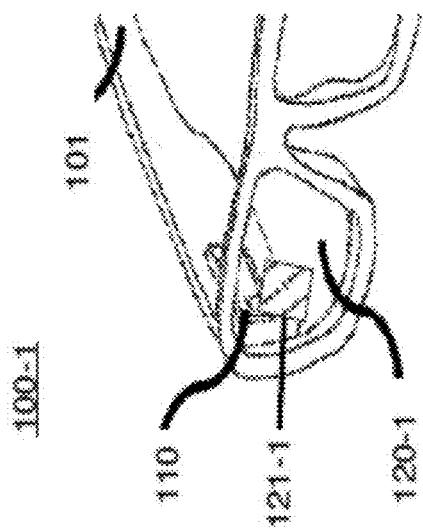

FIGS. 3A-3C illustrate additional example implementations of the device 100. In particular, FIGS. 3A-3B are perspective views of the device 100-a with a removable lens 120-a disposed in the frame 101 while FIG. 3C is a block diagram of a top view of the device 100 reflecting light based on the lenses 120-a, where "a" is a positive integer. It is noted, as described above, the lenses 120-a may be provided and coupled to the frame 101 to provide the device 100 configured to project an image for a particular IPD of a user.

For example, a lens 120-1 is depicted removably coupled to the frame 101 in FIG. 3A while a lens 120-2 is depicted removably coupled to the frame 101 in FIG. 3B to form device 100-1 and device 100-2, respectively. It is noted, that although only two lenses 120-1 and 120-2 are depicted, the device 100-a and, in particular, the frame 101 may be configured to receive any number of lenses. More specifically, the frame 101 and the projection system 110 are consistent between devices 100-1 and 100-2 while the removable lens 120-a with an HOE 121-a is different. That is, lens 120-1 is disposed in frame 101 for device 100-1 while lens 120-2 is disposed in frame 101 for device 100-2.

Turning more specifically to FIG. 3A, the lens 120-1 is depicted including an HOE 121-1 in a first location. It is noted, that the HOEs 121-a depicted herein are depicted as square for convenience and clarity. However, the HOEs may be any shape or geometry suitable for a given implementation, such as for example rectangular, circular, polygonal, or the like.

Turning more specifically to FIG. 3B, the lens 120-2 is depicted including an HOE 121-2 in a second location, different than the first location. In particular, the location of the HOE 121-2 has been shifted horizontally from the location of the HOE 121-1. It is noted, that the examples used herein depict HOEs with locations shifted horizontally. However, a lens 120-a may be provided with a position of an HOE 121-a in the lens shifted horizontally and/or vertically relative to another HOE 121-a in another lens 120-a.

Turning more specifically to FIG. 3C, a top view of the device 100 with a lens 120-a is depicted. It is noted, that the lens 120-a depicted in this figure is shown with HOE 121-1 (dashed-dotted line) and 121-2 (dashed-double-dotted line) in horizontal locations within the lens 120-a. This is done for clarity in describing the reflection of light from the HOEs 121-*a* based on their position relative to the projection system 110. However, it is noted, that the lens 120-*a* need not be provided with both the HOE 121-1 and 121-2. In particular, the lens 120-*a* may be provided with either the HOE 121-1 or the HOE 121-2, or another HOE 121-*a* in a different location.

During operation, the projection system 110 projects light 233 onto the lens 120. For example, the projection system (e.g., by rotating the mirror 115, or the like) scans light 233 over an area of the lens 120-*a* to include the area 301 (e.g., defined by solid lines) where an HOE (e.g., HOE 122-1, the HOE 122-2, or the like) is positioned.

Additionally, the projection system 110 is configured to modulate and/or otherwise modify the light 233 to project an image onto a portion of the area 301 (e.g., defined by solid lines). Furthermore, the projection system 110 may be configured to scan light 233 over the area 301 and to modulate the light 233 to project an image onto an area 303 (e.g., defined by dashed-dotted lines) corresponding an area of the lens 120-*a* where the HOE 121-1 is positioned. Accordingly, the HOE 121-1 may reflect and diffuse the light 233 as light 235-1 to project an image to exit pupil 237-1. As another example, the projection system 110 may be configured to scan light 233 over the area 301 and modulate the light 233 to project an image onto an area 305 (e.g., defined by dashed-double-dotted lines) corresponding an area of the lens 120-*a* where the HOE 121-2 is positioned. Accordingly, the HOE 121-2 may reflect and diffuse the light 233 as light 235-2 to project an image to exit pupil 237-2.

It is noted, that the exit pupils 237-*a* are offset from each other in a horizontal direction. Said differently, the exit pupils are shifted horizontally. Accordingly, a lens (e.g., the lens 121-1, 121-2, or the like) may be provided and the projection system 110 configured to provide an exit pupil (e.g., the exit pupil 237-1, the exit pupil 237-2, or the like) for a particular IPD.

FIGS. 4A-4C and 5A-5C depict example implementations of the device 100 for two different users, respectively, each having different IPDs. It is noted, that these example implementations, the hypothetical user's and their hypothetical IPDs are provided for convenience and clarity in discussing the examples of the present disclosure. Furthermore, these figures are not drawn to scale. Examples are not limited in any of these respects.

Turning more particularly to FIGS. 4A-4C, these figures depict the example implementation of the device 100-1 provided to a user 400-1. In FIG. 4A, the user 400-1 is depicted including eyes 440-11 and 440-12, and a corresponding IPD 401-1. More specifically, the distance between the input pupils 441-11 and 441-12 of the user's eyes 440-11 and 440-12 is the IPD 401-1.

The user 400-1 is depicted wearing the device 100-1, which has the removable lens 120-1 operably coupled therein. In FIG. 4B, the lens 120-1 is depicted with the HOE 121-1 in a particular location. More specifically, the HOE 121-1 is depicted disposed a horizontal distance 411 away from the projection system 110. In FIG. 4C, a top view of the user 400-1 wearing the device 100-1 is depicted. The projection system 110 is depicted projecting light 233-1 over the area 301 and modulating the light 233-1 to project an image over area 303 corresponding to the location of the HOE 121-1. The image is reflected by the HOE 121-1 as light 235-1 to exit pupil 237-1. The exit pupil 237-1 is proximate to the input pupil 441-11 of the users eye 440-11. Accordingly, by providing the lens 120-1, and particularly by coupling the lens 120-1 to the frame 101 to form the device 100-1, a HWD with a lens and an HOE to provide an exit pupil (e.g., the exit pupil 237-1) for a particular users IPD is provided.

Turning more particularly to FIGS. 5A-5C, these figures depict the example implementation of the device 100-2 provided to a user 400-2. In FIG. 5A, the user 400-2 is depicted including eyes 440-21 and 440-22, and a corresponding IPD 401-2. More specifically, the distance between the input pupils 441-21 and 441-22 of the user's eyes 440-21 and 440-22 is the IPD 401-2. It is noted, that the IPD 401-2 is less than the IPD 401-1. Said differently, the distance between the eyes of the user 400-2 is less than the distance between the eyes of the user 440-1.

The user 400-2 is depicted wearing the device 100-2, which has the removable lens 120-2 operably coupled therein. In FIG. 5B, the lens 120-2 is depicted with the HOE 121-2 in a particular location. More specifically, the HOE 121-2 is depicted disposed a horizontal distance 511 away from the projection system 110. It is noted that the distance 511 is greater than the distance 411. In FIG. 5C, a top view of the user 400-2 wearing the device 100-2 is depicted. The projection system 110 is depicted projecting light 233-2 over the area 301 and modulating the light 233-2 to project an image over area 305 corresponding to the location of the HOE 121-2. The image is reflected by the HOE 121-2 as light 235-2 to exit pupil 237-2. The exit pupil 237-2 is proximate to the input pupil 441-21 of the users eye 440-21. Accordingly, by providing the lens 120-2, and particularly by coupling the lens 120-2 to the frame 101 to form the device 100-2, a HWD with a lens and an HOE to provide an exit pupil (e.g., the exit pupil 237-2) for a particular users IPD is provided.

Accordingly, as depicted in FIGS. 4A-4C and 5A-5C, a HWD configured to receive a removable lens (e.g., the lens 120-1, the lens 120-2, or the like) may be provided to provide a HWD with an eyebox (e.g., exit pupil or the like) for different IPDs. Accordingly, the device 100 may be configured for a particular user by, for example, measuring the user's IPD (e.g., in an optometrist office, using digital tools, or the like) and fixing the appropriate lens 120-*a* into the frame 101.

Figure 6:
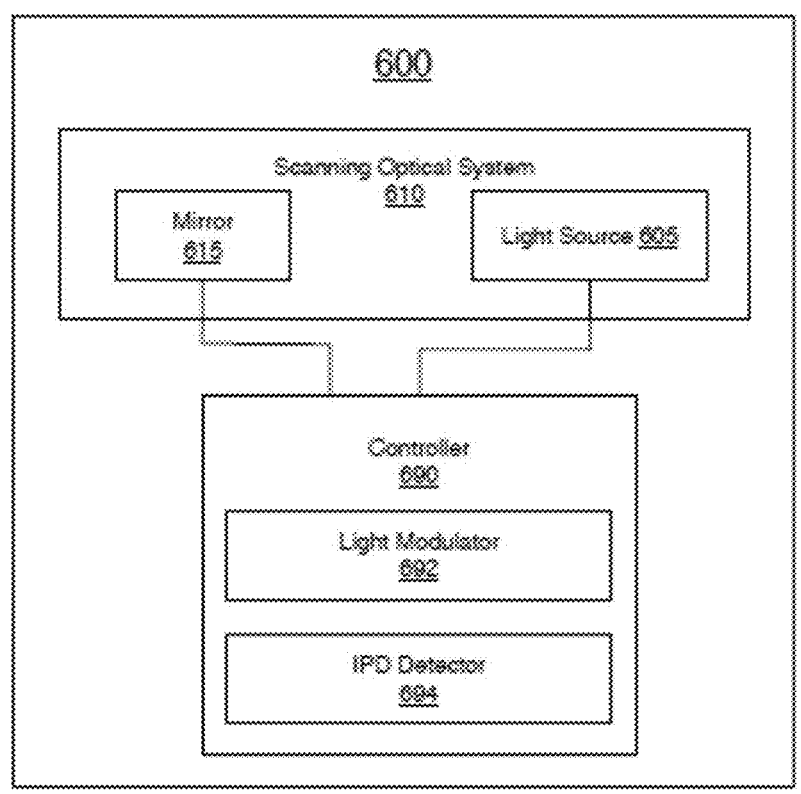
FIG. 6 illustrates an example third system.

FIG. 6 depicts a block diagram of an optical projection system 600. In some examples, the optical projection system 600 may be implemented as the projection system 110 described herein. In general, the system 600 may be provided to project light over a large area (e.g., corresponding to a wide range of IPDs, the area 301, or the like) and during operation, to modulate the light to project an image over a portion of the area (e.g., corresponding to a location of an HOE, the area 303, the area 305, or the like).

The system 600 may include a scanning optical system 610. The scanning optical system 610 may include a light source 605 (e.g., a laser, an LED, or the like). Additionally, the system 610 includes a mirror 615. The mirror 615 may be a MEMS based mirror configured to rotate about a number of axes to scan light emitted from the light source across a projection surface (e.g., the lens 120-*a*, the area of the HOE 121-*a*, or the like).

The system 600 may also include a controller 690. In general, the controller 690 may comprise hardware and/or software and may be configured to execute instructions to cause the controller 690 to send one or more control signals to light source 605 and/or the mirror 615 to cause the light source 605 to emit light and the mirror 615 to rotate about a number of axes to project the light over a particular area corresponding to the HOE of a lens removably fixed in a frame of a device to which the system 600 is disposed.

The controller 690 may include a light modulator 692 configured to modulate the light source 605 and/or the mirror 615 to cause the scanning optical system 610 to scan light over a first area and to project an image over a second area smaller than the first area, where the second area is located within the first area. For example, the light modulator 692 may cause the system 610 to scan light 233 over the area 301 and to modulate the light to project an image over the area 303 or 305. For example, the light modulator 692 may send a control signal to the light source 605 and/or the mirror 615 to project the image over a portion of the overall scanning area corresponding to the location of an HOE (e.g., the area 303, the area 305, or the like).

The controller 690 may also include an IPD detector 694. With some examples, the IPD detector may receive an information element to include an indication of an IPD (e.g., the IPD 401-1, 401-2, or the like) or an indication of a location of an HOE (e.g., the horizontal displacement from the projector (e.g., the displacement 411, the displacement 511, or the like). For example, the IPD detector 694 may receive an information element from a smart phone (or the like) to include an indication of the location of the HOE in the lens 120-a removably coupled to the frame 101.

With some examples, the lens 120 may include an RFID emitter. The IPD detector 694 may receive an information element from the lens 120-a (e.g., from the RFID emitter, or the like) to include an indication of the location of the HOE in the lens.

With some examples, the lens 120 may include a contact (e.g., a spatially coded electronic contact, or the like) that may electrically communicate with a contact (e.g., a spatially coded electronic contact) on the frame 101. The IPD detector 694 may receive a control signal from the contact on the frame to include an indication of the contact on the lens 120 to determine a location of the HOE in the lens 120.

In some examples, the lens 120 may include a reflective element to reflect light back at the projection system 110. The IPD detector 694 may send a control signal to the light source 605 and the mirror 615 to cause the light source 605 and the mirror 615 to project a light at the portion of the lens 120 that includes the reflector. The light may be reflected back to the projection system and received (e.g., by a photodiode or the like) to detect the lens, and particularly, the location of the HOE 121-a in the lens 120-a.

Figure 7:
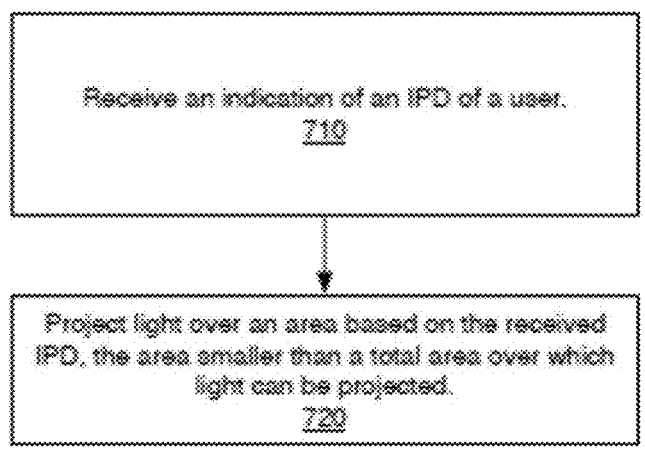
FIG. 7 illustrates an example first logic flow.

FIG. 7 depicts a logic flow 700 for projecting a virtual image. The logic flow 700 may begin at block 710. At block 710 "receive an indication of an IPD of a user," the controller 690 may receive an indication (e.g., control signal, information element, or the like) to include an indication of an IPD (e.g., the IPD 401-1, 401-2, or the like) of a user. In some examples, the received IPD may correspond to an IPD of a user to wear the device 100. In some examples, the received IPD may correspond to an IPD of a lens 120-a removably disposed in the frame 101. In some examples, the received IPD may correspond to a location (e.g., horizontal displacement 411, 511, or the like) of an HOE 121 removably disposed in the frame 101.

Continuing to block 720 "project an image over an area based on the received IPD, the area smaller than a total area over which light is scanned." At block 720 the controller 690 may send a control signal to the light source 605 and/or the mirror 615 to cause the system 610 to project an image over an area (e.g., the area 303, 305, or the like) corresponding to the received IPD, where the area over which the image is projected is less than the area over which light is scanned (e.g., the area 301, or the like).

Figure 8:
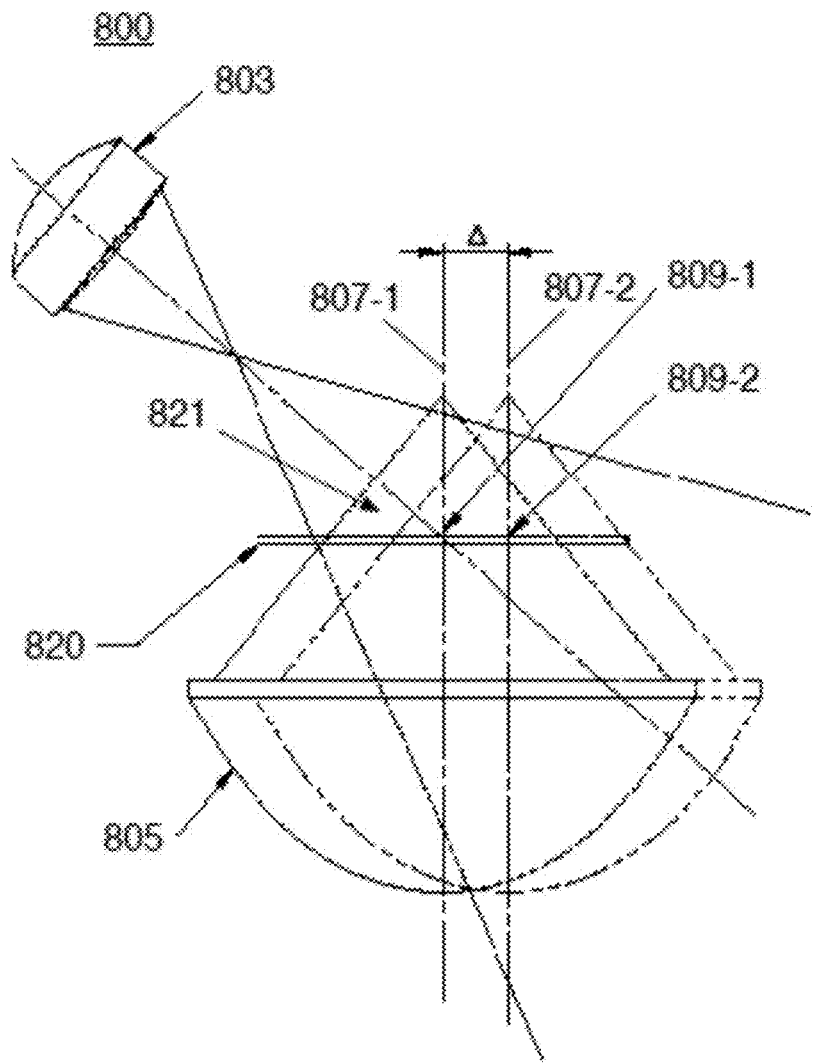
FIG. 8 illustrates an example fourth system.
Figure 9:
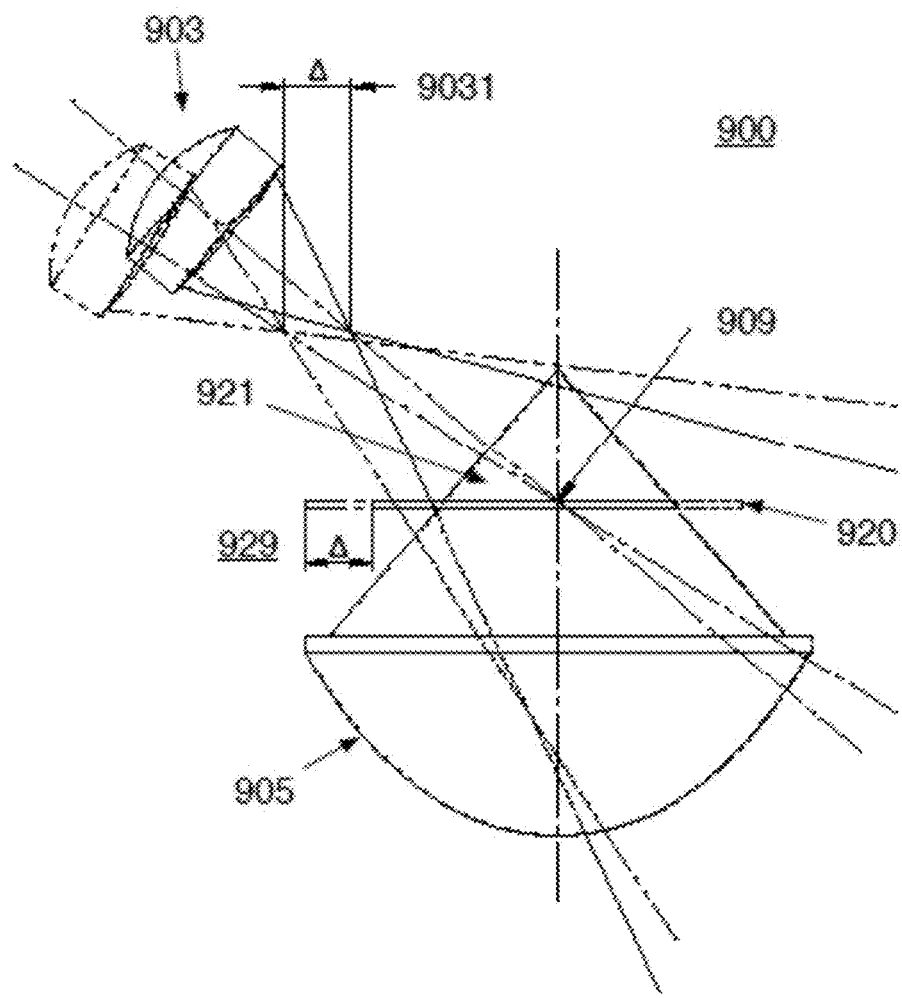
FIG. 9 illustrates an example fifth system.

HOEs, such as, for example, the HOEs 121-a, are fabricated by interfering a reference beam and an object beam. In particular, the reference beam and the object beam are directed at the lens and intersect along a portion of the lens to form the HOE. FIGS. 8-9 are block diagrams of example systems for interfering an object beam with a reference beam to form an HOE.

Turning more specifically to FIG. 8, a system 800 for recording an HOE 821 in a lens 820 is depicted. The system 800 includes a fixed reference beam 803 and a moveable object beam 805 with a moveable center position 807-a. Additionally, the lens 820 is fixed. Accordingly, the object beam can be moved to form an HOE in different portions of the lens 820. For example, the object beam 805 is shown with a first center position 807-1 and a second center location 807-2. In particular, the object beam 805 may be adjusted to have a center position 807-1 to form an HOE with a center position 809-1. Alternatively, the object beam 805 may be adjusted to have a center position 807-2 to form an HOE with a center position 809-2.

Turning more specifically to FIG. 9, a system 900 for recording an HOE 921 in a lens 920 is depicted. The system 900 includes a fixed object beam 905 and a moveable reference beam 903. Additionally, the lens 920 is configured to be moved. For example, the lens 920 may be moved along displacement 929. Accordingly, during operation, the reference beam 903 is moved along trajectory 9031 to interfere with the fixed object beam 905 to form an HOE with a center position 909. To form an HOE with a center position 909 in a different location of the lens 920, the lens may be moved, for example, along displacement 929.

FIG. 10 depicts a logic flow 1000 for manufacturing an HOE in a lens. The logic flow 1000 may begin at block 1010. At block 1010 "project an object beam and a reference beam to interfere with each other to form an HOE having a center in a first position of the lens," the reference beam 903 and the object beam 905 may be projected to interfere with each other to form an HOE in a lens. For example, the HOE 821 and/or 921 may be formed in the lenses 820 and/or 920, respectively.

Continuing to block 1020 "displace at least one of the reference beam, the object beam, or the lens to change the position of the center of the HOE along a horizontal direction of the lens" the reference beam 903, the object beam 905, and/or the lens (e.g., 820, 920, etc.) can be displaced to change a center position of the HOE. For example, the reference beam 903, the object beam 905 and/or the lenses 820/920 may be displaced to change a center position (e.g., 809-1, 809-2, 909, etc.) of the HOE.

In some examples, the object beam 805 may be displaced from position 807-1 to 807-2 to change the center of the HOE 821 from 809-1 to 809-2. In some examples, the lens 920 may be displaced along displacement 929 to change the center position 929 of the HOE 921 to a different position in the lens 920.

Figure 11C:
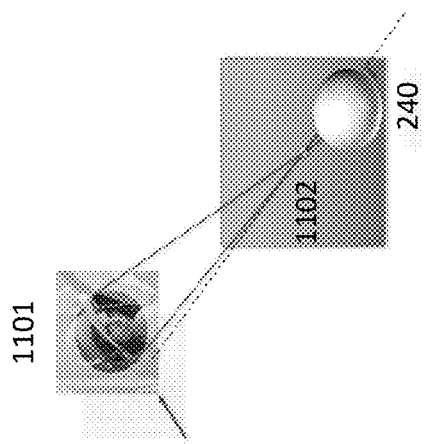
FIGS. 11A-11C illustrate the "keyhole" effect.
Figure 11B:
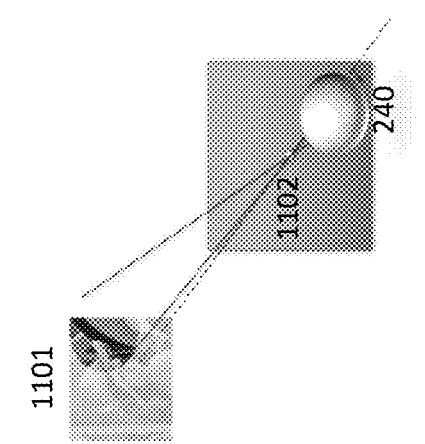
Figure 11A:
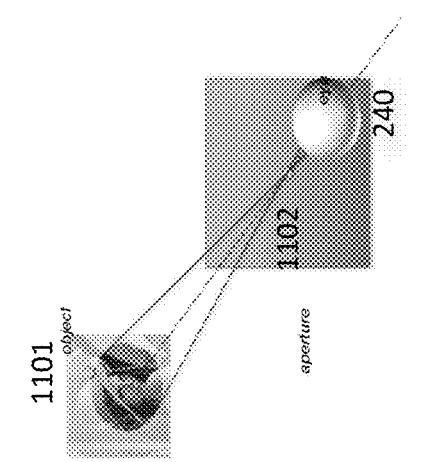

FIGS. 11A-11C illustrate the "keyhole" effect, manipulation of which effect enables further enhancement of aligning the image, the HWD exit pupil, and the eye of the viewer. As shown in FIG. 11A, when the "keyhole" or aperture 1102 (corresponding to exit pupil 237 of FIG. 2) is properly aligned with the eye 240 and the image of the object 1101, the image is fully viewable. However, as shown in FIG. 11B, if the eye 240 is misaligned with the axis extending between the image of the object 1101 and the "keyhole" or aperture 1102, the image is not fully viewable. By shifting the image of the object 1101 as shown in FIG. 11C, the eye 240 can be aligned with the image of the object 1101 and the "keyhole" or aperture 1102, thereby making the image fully viewable.

Figure 12:
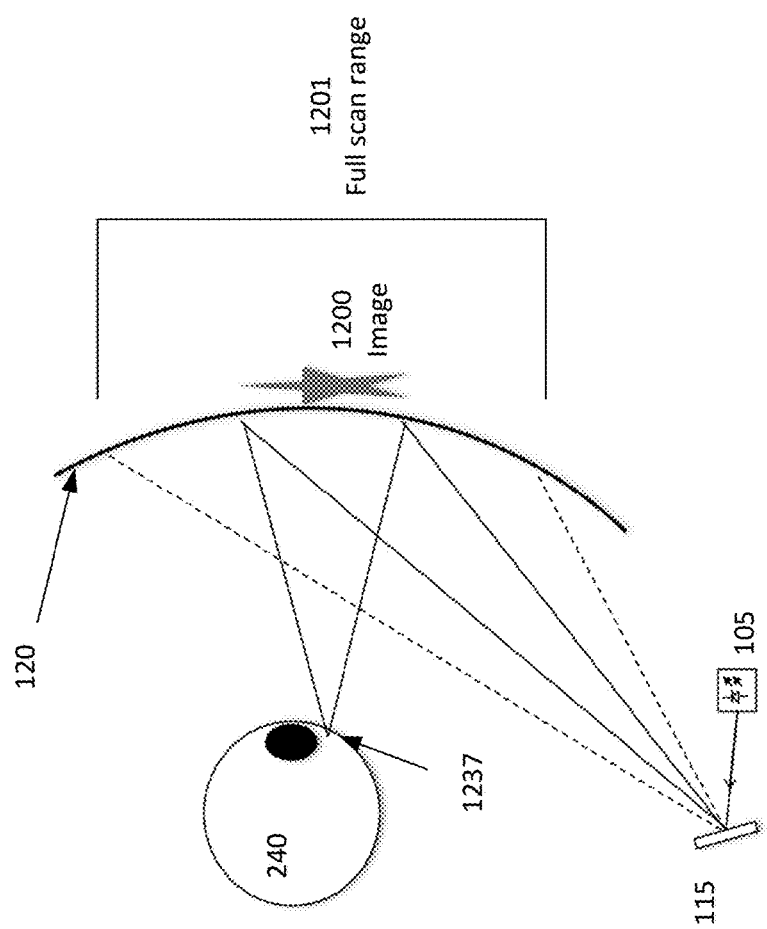
FIGS. 12-14 illustrate an example manipulation of the "keyhole" effect.
Figure 13:
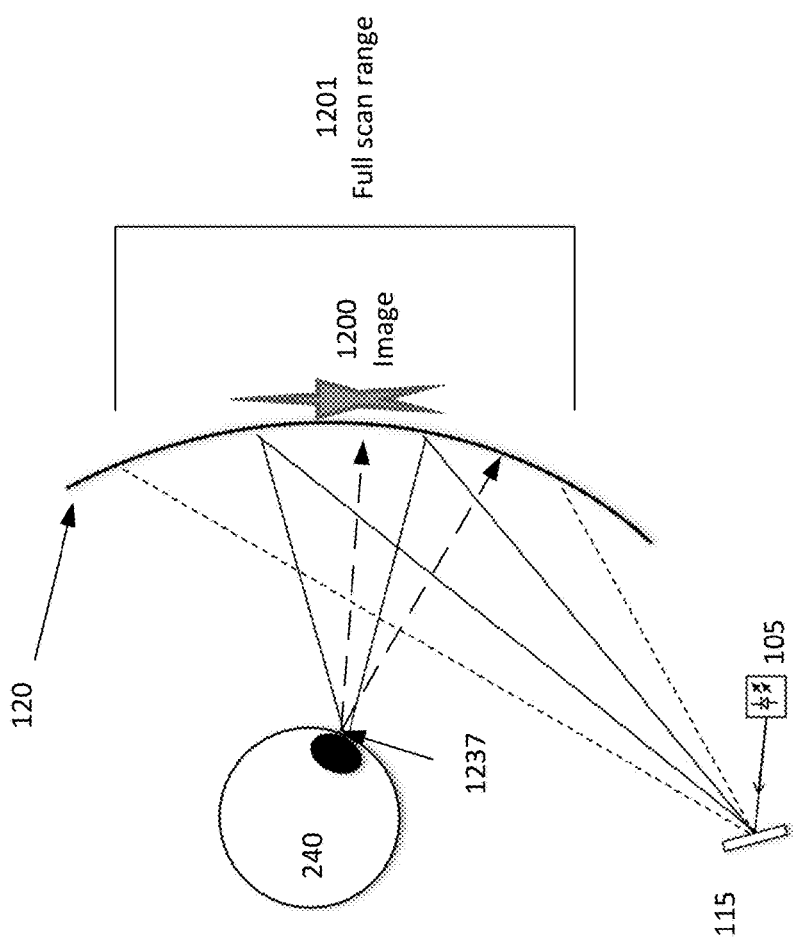
Figure 14:
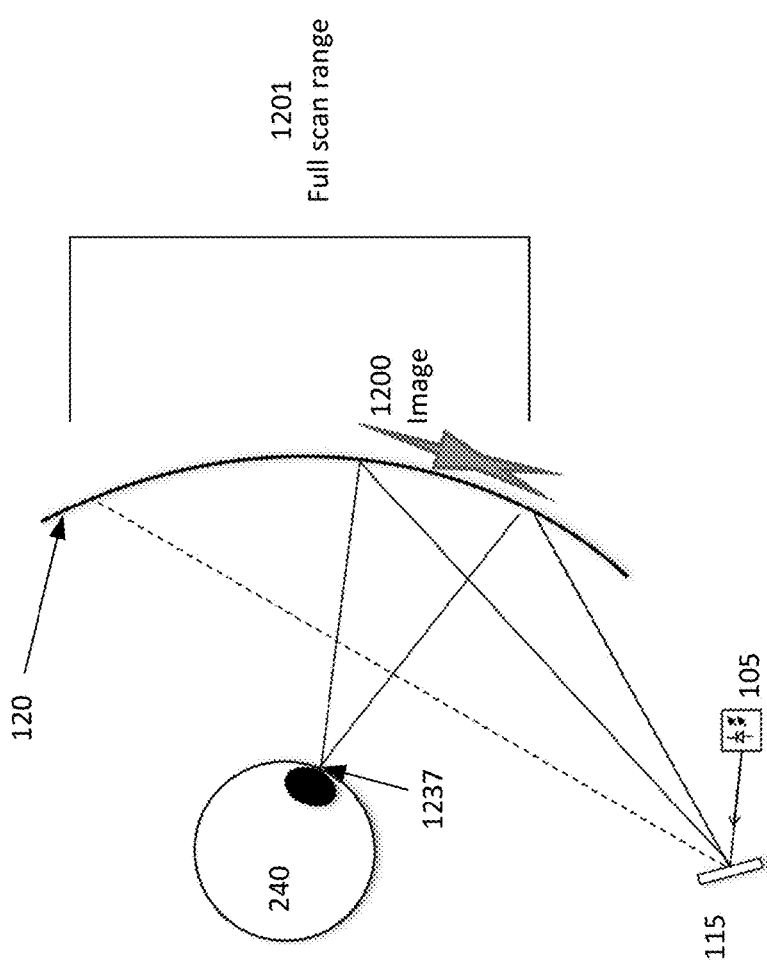

FIGS. 12-14 illustrate an example manipulation of the "keyhole" effect to further enhance alignment of the image, the HWD exit pupil, and the eye of the viewer using the HWD. FIG. 12 depicts an image 1200 displayed on the lens 120 by using the display light source 105 and the MEMS scanning mirror 115, the location of which image 1200 within the scan range 1201 is such that the exit pupil 1237 corresponding to the image 1200 is misaligned with the eye 240. This may occur, for example, due to a finite number of IPD-size locations for the lenses. For example, for the lens 120-*a* shown in FIG. 3C, two IPD-size locations for HOEs are shown, e.g., locations for HOE 121-1 and HOE 121-2. If the user's actual IPD size does not fully match the image location corresponding to the particular HOE (e.g., HOE 121-1 or HOE 121-2) included in the lens, then the misalignment between the eye 240 and the exit pupil 1237 shown in FIG. 12 may occur.

As shown in FIG. 13, the user may rotate the eye 240 to find the exit pupil 1237, but the image 1200 will not be fully viewable to the user due to the misalignment between the gaze direction (line of sight) of the eye 240 and the position of the image 1200, which misalignment corresponds to the "keyhole" mismatch depicted in FIG. 11B. In order to eliminate the misalignment, the position of the image 1200 may be shifted to align the eye 240, the exit pupil 1237 and the image 1200, as shown in FIG. 14, which shift enables the viewer's eye 240 to see the full image 1200. As long as the misalignment is within the translation range of the eye, the image 1200, the exit pupil 1237 and the eye 240 can be made to align.

An example calculation of image adjustment to compensate for an IPD discrepancy is provided below. For a user with an IPD 2 mm smaller than the IPD of the HWD as represented by the location of the holographic lens element (e.g., HOE 121-1 or HOE 121-2) for a particular IPD, the user's eye should rotate 1 mm to find the light from the display. To translate the eye's pupil by 1 mm, it must rotate by approximately:

$$\emptyset=\sin^{-1}(1\ mm/10\ mm)=5.7\ degrees$$

Accordingly, the center of the image should be digitally adjusted roughly 5.7 degrees toward the user's temple. Assuming an eye relief of 18 mm, the corresponding lateral adjustment of the image on the holographic lens element is:

$$X = \frac{-18}{10}\left(\frac{\Delta IPD}{2}\right) = 1.8\ mm$$

where ΔIPD is the user's actual IPD minus the IPD of the holographic lens element. A positive value for X represents an image shift toward the user's temple. Thus, a user with an IPD 2 mm smaller than the IPD of the HWD as represented by the location of the holographic lens element should have the image displaced by roughly the same amount in the opposite direction, e.g., toward the temple in this case, to best align the image to the user's vision.

The image adjustment to compensate for an IPD discrepancy may be facilitated by using a software look-up table correlating a user's measured IPD with the IPD of the HWD as represented by a selected lens identifier and/or holographic lens element identifier corresponding to a particular IPD. In this manner, an ideal image position within the full scan range 1201 may be determined.

Figure 15:
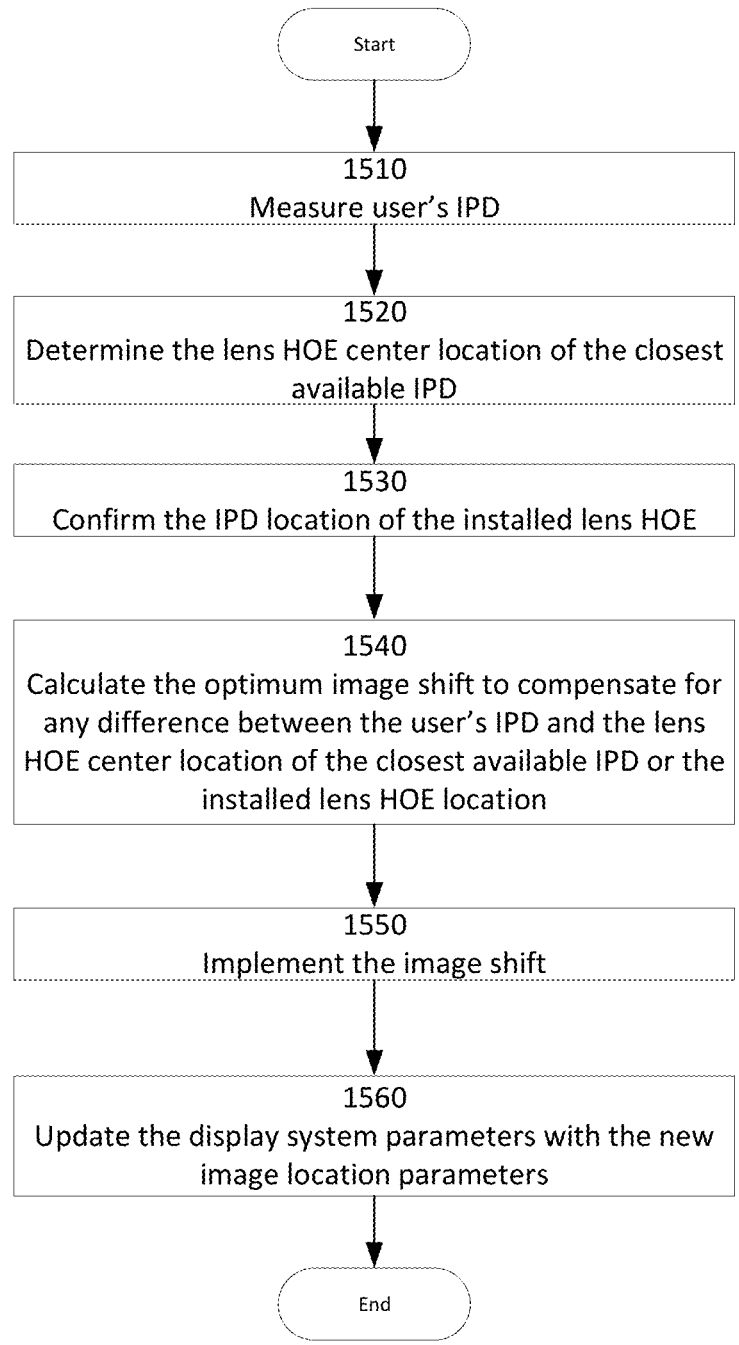
FIG. 15 illustrates an example third logic flow.

FIG. 15 depicts a logic flow 1500 for implementing a correction of the "keyhole" mismatch according to an example embodiment. At block 1510, the user's IPD is measured, e.g., by the controller 690 shown in FIG. 6, by an external measurement unit or an external control unit. At block 1520, the center of the lens location of the closest available IPD for the lens (e.g., having HOE 121 of FIGS. 1 and 2, the center of the HOE corresponding to the center of the lens) to be installed may be determined, e.g., by the controller 690 or an external control unit. Alternatively, or in addition, the IPD location of the installed lens may be determined at block 1530, e.g., by the controller 690 or an external control unit. If the IPD location of the installed lens has been previously determined and/or recorded, block 1520 may be skipped. At block 1540, the optimum image shift to compensate for any difference between the user's measured IPD and the center of the lens location of the closest available IPD or the installed lens location may be determined. At block 1550, the optimum image shift may be implemented, e.g., by the controller 690 shown in FIG. 6 or by an external control unit. At block 1560, the display system parameters, e.g., the system parameters of the projection system 600 shown in FIG. 6, may be updated with the new, shifted image location parameters. The new, shifted image location parameters may be stored in the controller 690 or in an external control unit, for example. The new, shifted image location parameters may correspond to an image location at which the line of sight of the user's eye is aligned with the exit pupil and the image (see, e.g., FIGS. 11C and 14).

Figure 16:
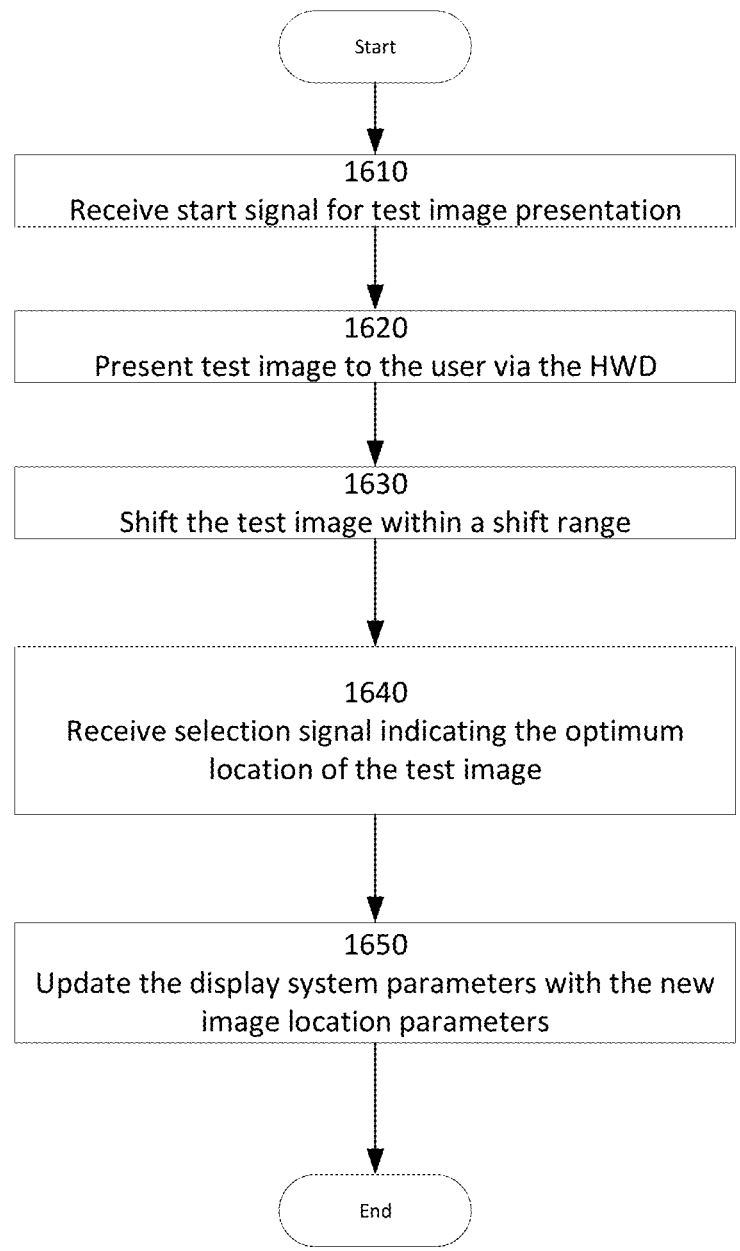
FIG. 16 illustrates an example fourth logic flow.

FIG. 16 depicts a logic flow 1600 for implementing a correction of the "keyhole" mismatch according to an example embodiment. At block 1610, a start signal for test image presentation on the lens 120 may be received, e.g., by the controller 690 shown in FIG. 6, or by an external control unit such as a mobile phone. The start signal for test image presentation may be, e.g., a user's input signal generated via the HWD 100 shown in FIG. 1 or via an external control unit, e.g., a mobile phone or a computer. At block 1620, a test image may be presented to the user via the lens 120 (e.g., having HOE 121 of FIGS. 1 and 2) of the HWD. At block 1630, the test image may be shifted within a predefined shift range (e.g., on the HOE 121), e.g., by the controller 690 or by a user's control input via an input element of the HWD or an input element of an external control unit, which user's control input is subsequently routed to the controller 690. At block 1640, a selection signal indicating the optimum location of the test image is received, e.g., by the controller 690 shown in FIG. 6, or by an external control unit, e.g., a mobile phone or a computer. The selection signal may be generated based on a user's control input, e.g., via an external control unit or via an input element on the HWD 100. Alternatively, the selection signal may be generated based on tracking of the line of sight 243 shown in FIG. 2. At bock 1650, the display system parameters, e.g., the system parameters of the projection system 600 shown in FIG. 6, may be updated with the image location parameters corresponding to the selected optimum test image location. The updated image location parameters may be stored in the controller 690 or in an external control unit, for example. The update image location parameters may correspond to an image location at which the line of sight of the user's eye is aligned with the exit pupil and the image (see, e.g., FIGS. 11C and 14).

The ability to correct for the "keyhole" mismatch, e.g., using the logic flows 1500 and 1600, provides a degree of tolerance for misalignment between the user's actual IPD and the IPD of the HWD as represented by a selected lens identifier and/or holographic lens element identifier corresponding to a particular IPD. This tolerance reduces the required number of holographic lens elements corresponding to different IPDs to cover the IPD range for the general population.

Figure 17:
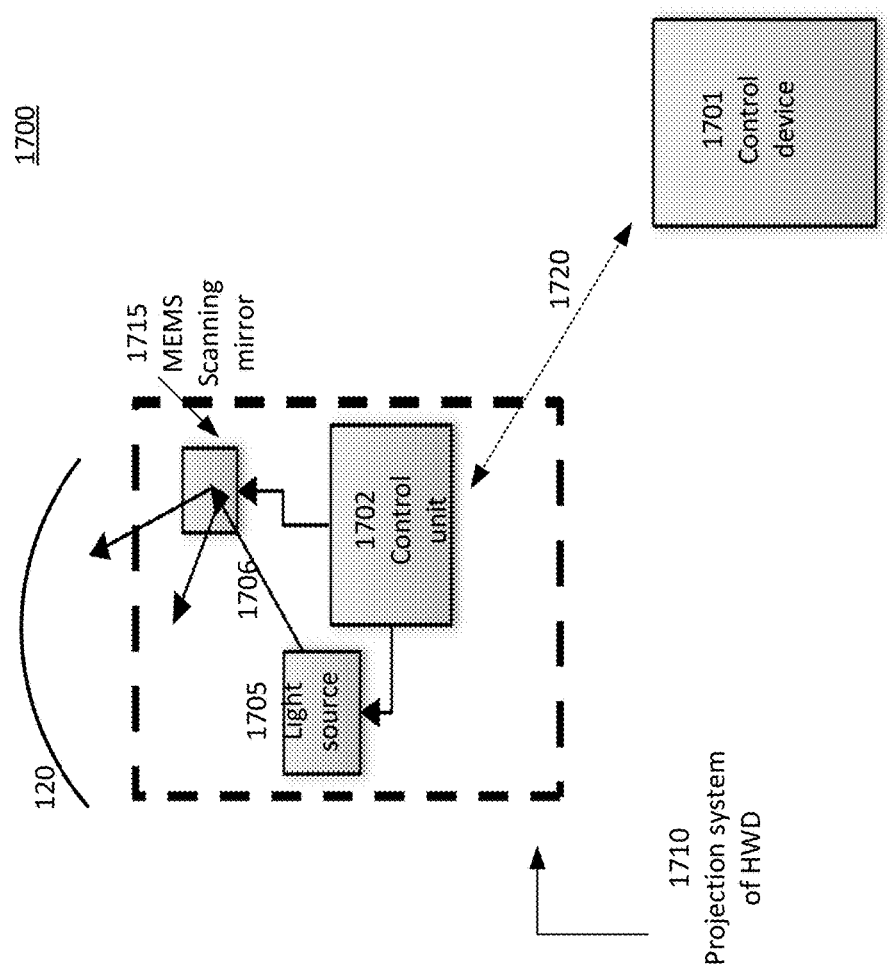
FIG. 17 illustrates an example sixth system.

FIG. 17 illustrates an overall architecture of system 1700 including an example implementation of a control device 1701 operatively linked via a communication connection 1720 to a projection system 1720. The optical projection system 1710 may incorporate elements similar to, and operate similarly to, the elements incorporated in the projection system 110 of FIG. 2 and/or the projection system 600 of FIG. 6, for example. The projection system 1710 may include, e.g., control unit 1702, a light source 1705, and a MEMS scanning mirror 1715. The light source 1705 emits a light beam 1706, which is in turn scanned by, and modulated by, the MEMS scanning mirror 1715 to project an image onto the lens 120. The communication connection 1720 linking the control device 1710 to the projection system 1720 may be, e.g., a wireless connection or a wired connection. The control device 1701 may perform the functions of the external control unit mentioned above in connection with the logic flow 1500 of FIG. 15 and the logic flow 1600 of FIG. 16. The control device 1701 may be, e.g., a mobile phone, a computer, or a dedicated external control device.

Figure 18:
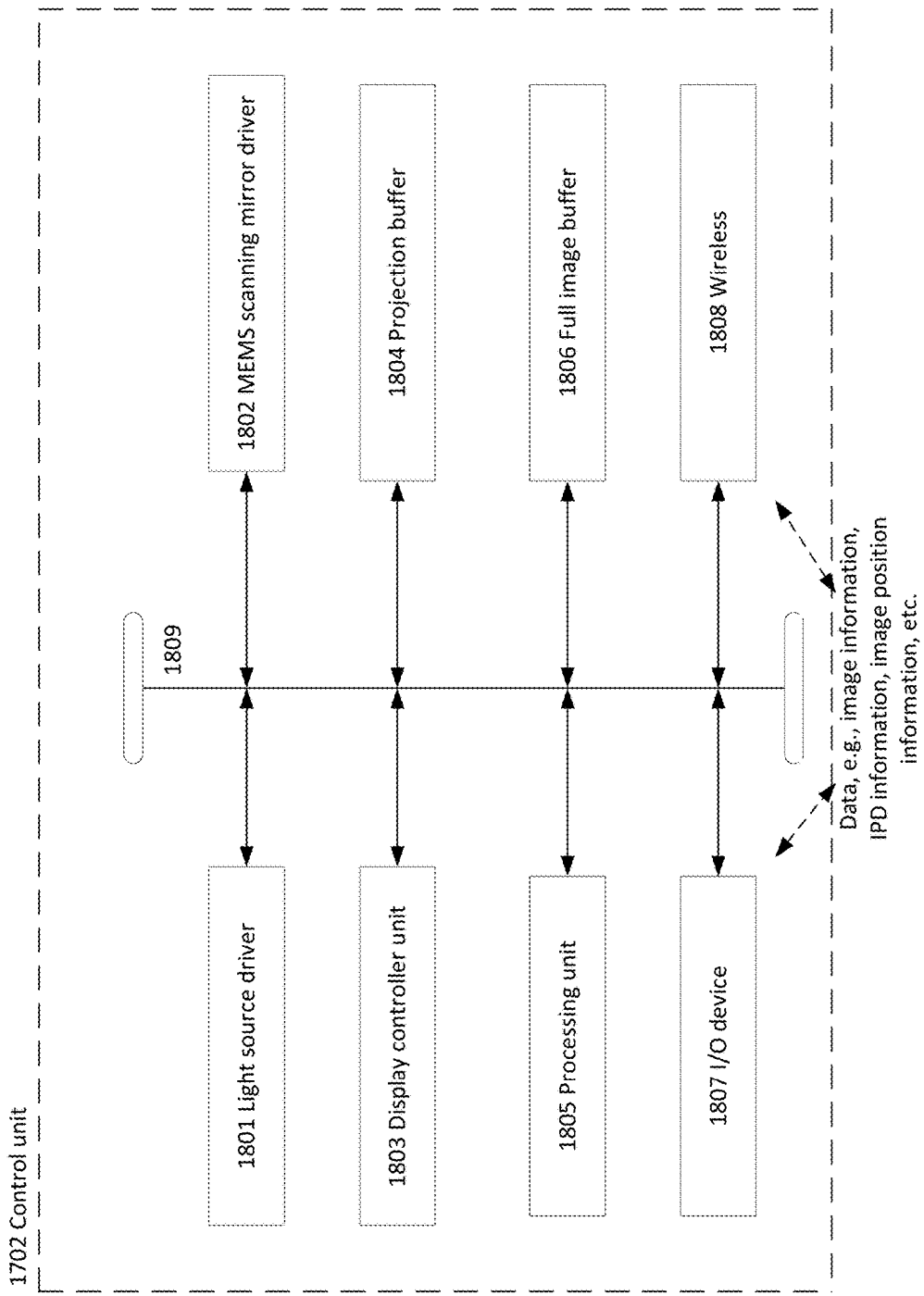
FIG. 18 illustrates an example control unit.

FIG. 18 illustrates one example embodiment of the control unit 1702, which is generally depicted in FIG. 17. As shown in FIG. 18, the control unit 1702 may include an I/O device 1807 and a wireless device 1808 for communicating data with external units, e.g., the control device 1701 shown in FIG. 17. In addition, the control unit 1702 may further include the following: image buffer 1806, processing unit 1805, projection buffer 1804, display controller unit 1803, MEMS scanning mirror driver 1802, and light source driver 1801. In the example embodiment shown in FIG. 18, the elements 1801-1808 may be communicatively linked by a bus 1809.

The image buffer 1806, to which the image information is supplied, and the projection buffer 1804, may have a larger buffer size than the largest image size, so that the projection buffer image pixels can be moved in the X or Y direction at a later point in time. For example, for an image size of 400×200 pixels, the projection buffer 1804 and the image buffer 1806 may have a size of 512×256 pixels. The processing unit 1805 may shift the start and end of the image pixel projection based on the updated image location parameters obtained from, e.g., logic flow 1500 or 1600. The projection buffer 1804, which may be controlled by the processing unit 1805, shifts a given image pixel position along the X or Y direction so that the pixel may be displayed at various times. The content of the projection buffer 1804 may be fed to the display controller unit 1803, which in turn may control the MEMS scanning mirror driver 1802 and the light source driver 1801 to project the image.

Figure 19:
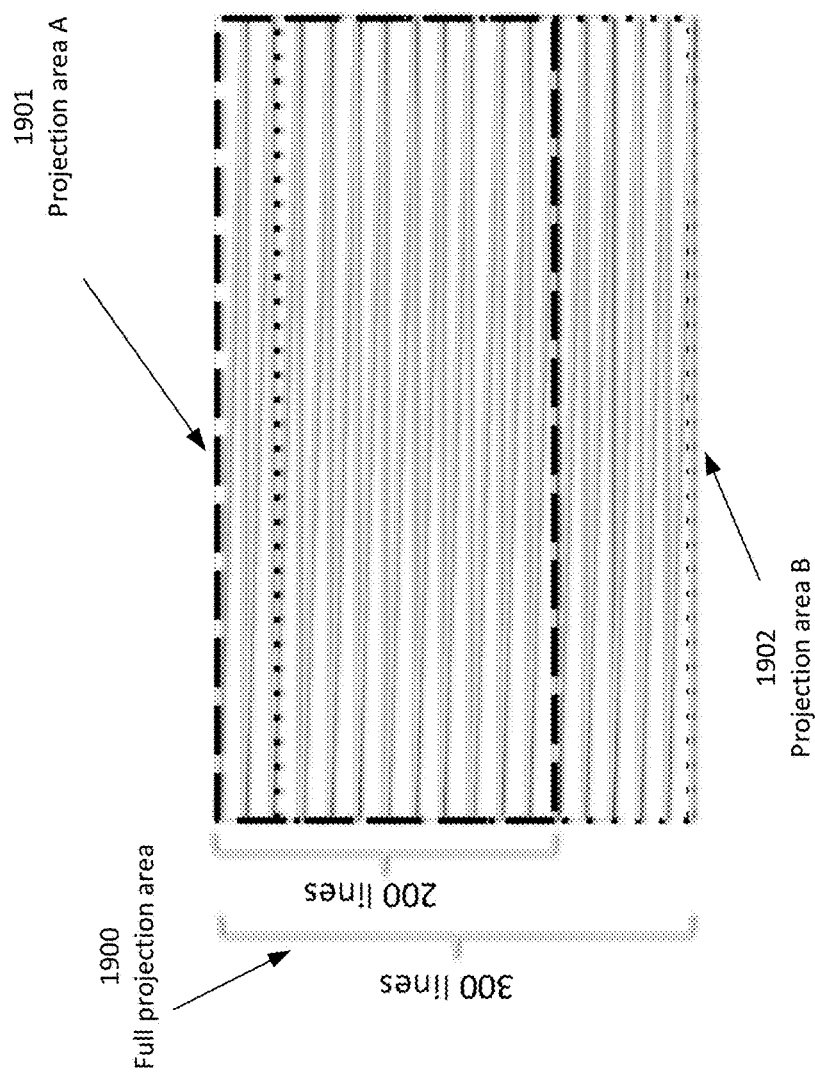
FIG. 19 illustrates varying the size of the projected image area along the vertical axis.

FIG. 19 illustrates varying the size of the projected image area along the vertical axis to enable adjustment of the image position along the vertical axis. Depending on a particular person's face morphology and/or nose-to-ear angle, the virtual image displayed on the HOE 121 shown in FIGS. 1 and 2, for example, can be perceived as being lower or higher than would be perceived by another person. In addition, for some particular applications, e.g., heads-up virtual display in a car, it is expected that the virtual image is not positioned lower than the dashboard, but rather slightly higher than the front hood of the car. To enable such a vertical adjustment, at least the vertical size of the projected image area on the HOE 121 is increased, and the vertical position of the first pixel to be displayed within the increased projected image area is varied. As an example, if the projected virtual image resolution is defined to have 200 horizontal lines at 100 Hz refresh rate, the MEMS-based projection system (e.g., system 110 of FIG. 2 or system 1710 of FIG. 17) will be designed to be able to scan over 200 lines (e.g., 300 lines) by either (i) maintaining the frequency of the MEMS scanning mirror (e.g., mirror 115 of FIG. 2 or mirror 1715 of FIG. 17) and lowering the display refresh rate, or (ii) increasing the frequency of the MEMS scanning mirror to scan the projected image area at faster speed to achieve the 300 lines at the same 100 Hz refresh. For these examples, the MEMS scanning mirror design specification would be as follows:

200 lines at a refresh rate of 100 Hz=mirror frequency of 10 kHz 300 lines at a mirror frequency of 10 kHz=refresh rate of 66 Hz 300 lines at a refresh rate of 100 Hz=mirror frequency of 15 kHz As shown in FIG. 19, by increasing the full projection area 1900 to 300 lines, two different perceived image locations may be provided. Projection area A, designated by reference number 1901, has the first line located at the very top of the full projection area 1900, thereby providing a higher perceived virtual image location. Projection area B, designated by reference number 1902, has the first line located below the very top of the full projection area 1900, thereby providing a lower perceived virtual image location.

Figure 20:
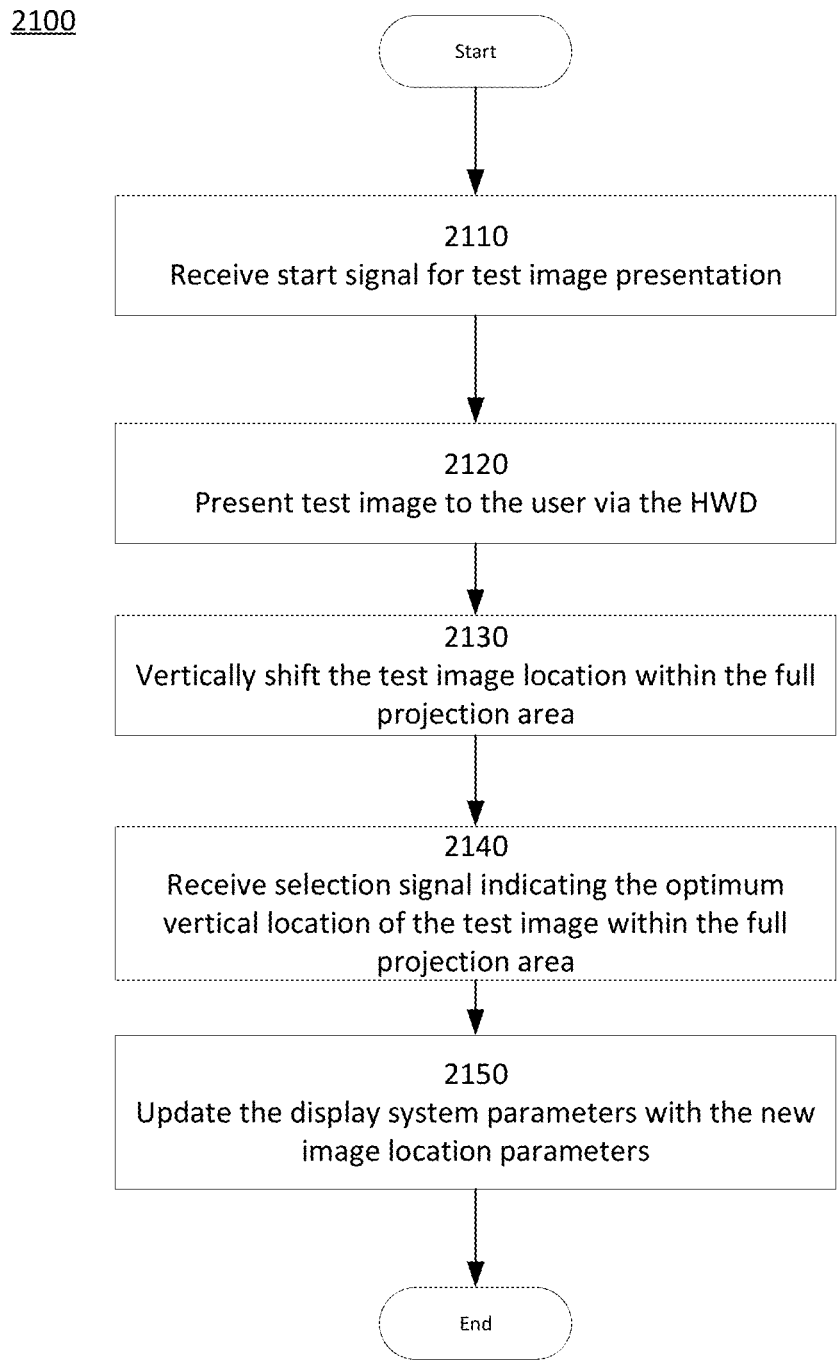
FIG. 20 illustrates an example fifth logic flow.

FIG. 20 depicts a logic flow 2100 for adjusting the image position along the vertical axis according to an example embodiment. At block 2110, a start signal for test image presentation on the lens 120 (having HOE 121) of the HWD may be received, e.g., by the controller 690 shown in FIG. 6, or by an external control unit such as a mobile phone. The start signal for test image presentation may be, e.g., a user's input signal generated via the HWD 100 shown in FIG. 1 or via an external control unit, e.g., a mobile phone or a computer. At block 2120, a test image may be presented to the user via the lens 120 (having HOE 121) of the HWD. At block 2130, the test image may be vertically shifted within the full projection area 1900 (e.g., on the HOE 121 of FIGS. 1 and 2) shown in FIG. 19, e.g., by the controller 690 or by a user's control input via an input element of the HWD or an input element of an external control unit, which user's control input is subsequently routed to the controller 690. At block 2140, a selection signal indicating the optimum vertical location of the test image within the full projection area is received, e.g., by the controller 690 shown in FIG. 6, or by an external control unit, e.g., a mobile phone or a computer. The optimum vertical location of the test image may correspond to a test image location at which the line of sight of the user's eye is aligned with the exit pupil and the image (see, e.g., FIGS. 11C and 14). The selection signal may be generated based on a user's control input, e.g., via an external control unit or via an input element on the HWD 100. Alternatively, the selection signal may be generated based on tracking of the line of sight 243 shown in FIG. 2. At bock 2150, the display system parameters, e.g., the system parameters of the projection system 600 shown in FIG. 6, may be updated with the image location parameters corresponding to the selected optimum vertical location of the test image. The updated image location parameters may be stored in the controller 690 or in an external control unit, for example.

Although logic flow 1600 of FIG. 16 and logic flow 2100 of FIG. 20 have been described as distinct logic flows, these two logic flows may be combined into one logic flow.

Figure 21:
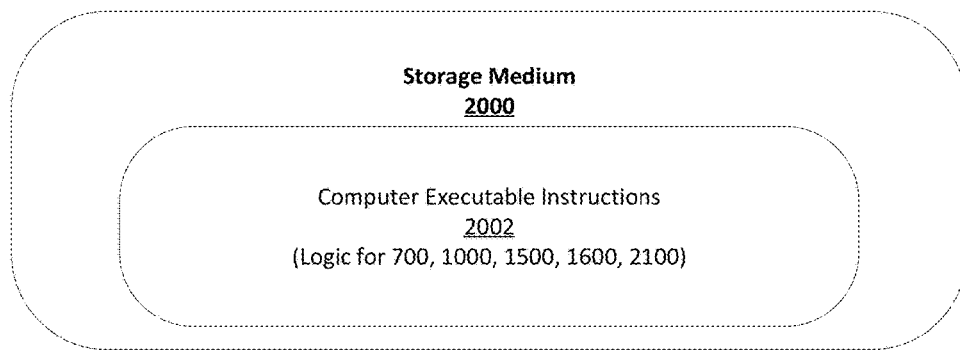
FIG. 21 illustrates an example computer readable medium.

FIG. 21 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement techniques 700 and 1000. For example, the storage medium 2000 may store various types of computer executable instructions to implement techniques 1500, 1600 and 2100.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 22:
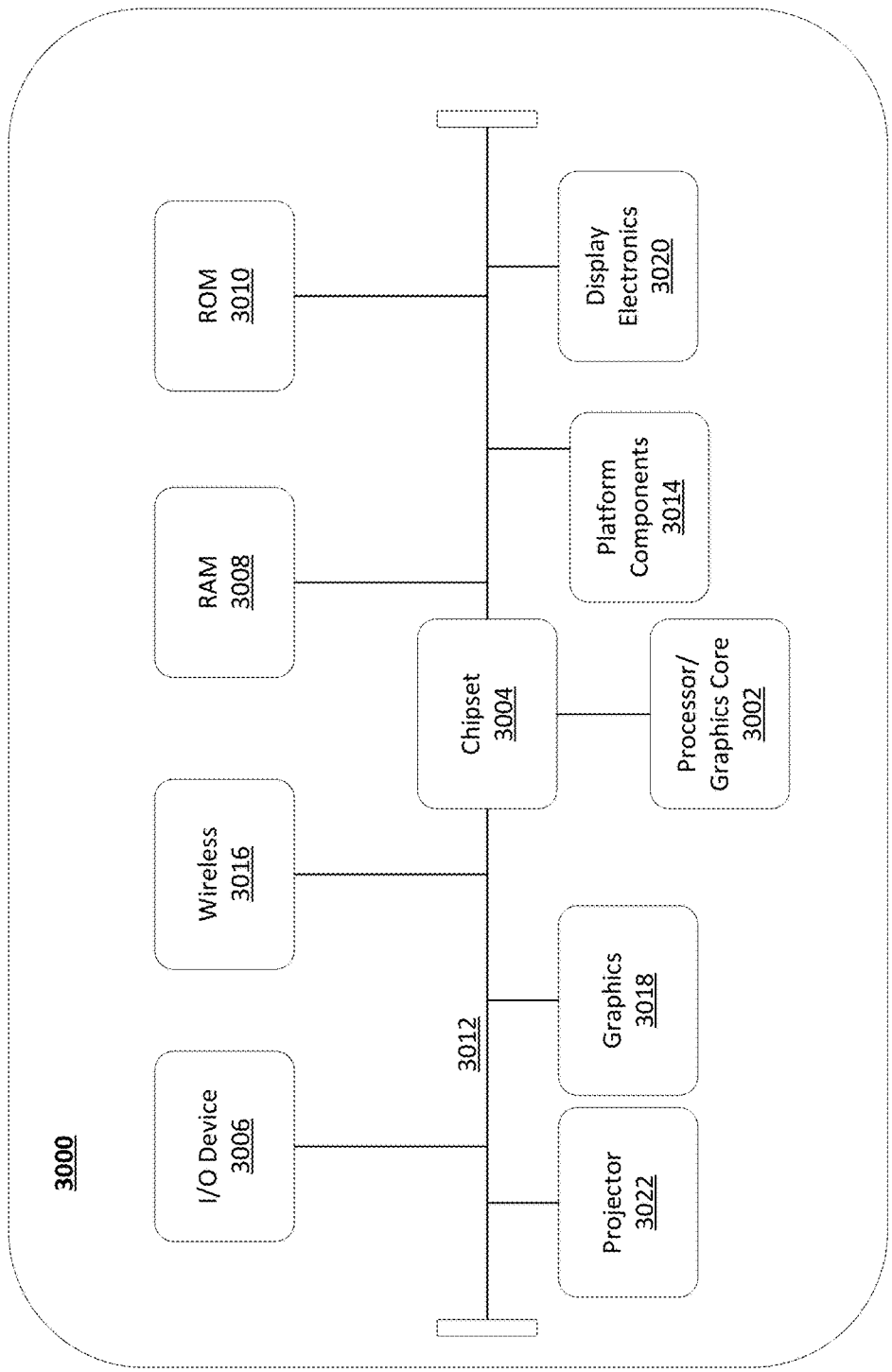
FIG. 22 illustrates an example seventh system.

FIG. 22 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020 (e.g., lens 120, lens 820, lens 920, or the like), projector 3022 (e.g., projector 110, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus, comprising: a projection surface, the projection surface comprising a holographic optical element (HOE) centered at a first location; a projector to project light onto a projection area comprising at least a portion of the projection surface comprising the HOE; and a controller to send a control signal to the projector to cause the projector to project an image onto a location shifted from the first location based on a misalignment of a user's line of sight with the first location.

Example 2

The apparatus of Example 1, the misalignment of the user's line of sight with the first location determined based on a difference between the user's interpupillary distance (IPD) and an IPD represented by the first location of the HOE.

Example 3

The apparatus of Example 1, an amount of shift of the image from the first location determined based on a selection signal indicating an image location at which the user's line of sight is aligned with at least the image.

Example 4

The apparatus of Example 1, comprising a frame, the projector coupled to the frame and the projection surface removably coupled to the frame.

Example 5

The apparatus of Example 4, wherein the projection surface is a first projection surface and the HOE is a first HOE, the frame to removably receive a second projection surface, the second projection surface comprising a second HOE centered at a second location on the second projection surface.

Example 6

The apparatus of Example 5, the controller to: receive an information element to include an indication of the first location or the second location; and send a control signal to the projector, based on the information element, to cause the projector to project an image onto one of (i) a location shifted from the first location based on a misalignment of the user's line of sight with the first location, or (ii) a location shifted from a second location based on a misalignment of the user's line of sight with the second location.

Example 7

The apparatus of Example 6, wherein (i) the shift of the image from the first location is in at least one of a horizontal direction or vertical direction relative to the first location, or (ii) the shift of the image from the second location is in at least one of a horizontal direction or vertical direction relative to the second location.

Example 8

The apparatus of Example 6, wherein (i) the misalignment of the user's line of sight with the first location is determined based on a difference between the user's interpupillary distance (IPD) and an IPD represented by the first location of the first HOE, or (ii) the misalignment of the user's line of sight with the second location is determined based on a difference between the user's interpupillary distance (IPD) and an IPD represented by the second location of the second HOE.

Example 9

The apparatus of Example 1, wherein the shift of the image from the first location is in at least one of a horizontal direction or vertical direction relative to the first location.

Example 10

A system for projecting an image, the system comprising: a frame to removably receive a first one of a plurality of projection surfaces, each of the plurality of projection surfaces comprising a holographic optical element (HOE) centered at a reference location; and a projection system coupled to the frame, the projection system comprising: a projector to project light onto a first one of the plurality of projection surfaces; and a controller to send a control signal to the projector to cause the projector to project an image onto a location shifted from the reference location of the HOE of the first one of the projection surfaces based on a misalignment of a user's line of sight with the reference location of the HOE.

Example 11

The system of Example 10, the frame to removably receive a second one of the plurality of projection surfaces.

Example 12

The system of Example 11, the controller to receive an information element to include an indication of the first one of the plurality of projection surfaces or the second one of the plurality of projection surfaces.

Example 13

The system of Example 12, the controller to send a control signal to the projector, based on the information element, to cause the projector to project an image onto one of (i) a location shifted from the reference location of the HOE of the first one of the projection surfaces based on a misalignment of the user's line of sight with the reference location of the HOE of the first one of the projection surfaces, or (ii) a location shifted from the reference location of the HOE of the second one of the projection surfaces based on a misalignment of the user's line of sight with the reference location of the HOE of the second one of the projection surfaces.

Example 14

The system of Example 13, wherein (i) the misalignment of the user's line of sight with the reference location of the HOE of the first one of the projection surfaces is determined based on a difference between the user's interpupillary distance (IPD) and an IPD represented by the reference location of the HOE of the first one of the projection surfaces, or (ii) the misalignment of the user's line of sight with the reference location of the HOE of the second one of the projection surfaces is determined based on a difference between the user's interpupillary distance (IPD) and an IPD represented by the reference location of the HOE of the second one of the projection surfaces.

Example 15

The system of Example 13, wherein (i) the shift of the image from the reference location of the HOE of the first one of the projection surfaces is in at least one of a horizontal direction or vertical direction relative to the reference location of the HOE of the first one of the projection surfaces, or (ii) the shift of the image from the reference location of the HOE of the second one of the projection surfaces is in at least one of a horizontal direction or vertical direction relative to the reference location of the HOE of the second one of the projection surfaces.

Example 16

The system of Example 13, the reference location of the HOE of the first one of the plurality of projection surfaces offset from the reference location of the HOE of the second one of the plurality of projection surfaces.

Example 17

The system of Example 11, wherein each of the plurality of projection surfaces is a glasses lens, a goggle lens, or a helmet visor, and wherein the frame is glasses, goggles, or a helmet.

Example 18

A method to project a virtual image, the method comprising: projecting a light beam onto a projection surface, the projection surface comprising a holographic optical element (HOE) centered at a first location; projecting an image onto a location shifted from the first location based on a misalignment of a user's line of sight with the first location; and reflecting the image from the HOE to a first exit pupil.

Example 19

The method of Example 18, the misalignment of the user's line of sight with the first location determined based on a difference between the user's interpupillary distance (IPD) and an IPD represented by the first location of the HOE.

Example 20

The method of Example 18, an amount of shift of the image from the first location determined based on a selection signal indicating an image location at which the user's line of sight is aligned with at least the image.

Example 21

The method of Example 20, wherein the selection signal is generated by a control device.

Example 22

The method of Example 20, wherein the selection signal is generated based on tracking of the user's line of sight.

Example 23

The method of Example 18, wherein the shift of the image from the first location is in at least one of a horizontal direction or vertical direction relative to the first location.

Example 24

The method of Example 18, wherein the projection surface is a first projection surface and the HOE is a first holographic optical combiner, the method comprising: projecting a light beam onto a second projection surface, the second projection surface comprising a second HOE centered at a second location; projecting an image onto a location shifted from the second location based on a misalignment of the user's line of sight with the second location; and reflecting the image from the HOE to a second exit pupil.

Example 25

The method of Example 24, wherein the first location corresponds to a first IPD and the second location corresponds to a second IPD different than the first IPD.

Example 26

The method of Example 19, wherein the IPD represented by the first location of the HOE is received from a control device.

Example 27

The method of Example 20, wherein the selection signal is generated in response to a control input by a user.

Example 28

The method of Example 18, comprising: emitting the light beam from a light source; receiving the light beam at a mirror; and rotating the mirror to scan the light beam onto the projection surface.

Example 29

A non-transitory machine-readable storage medium comprising instructions that, when executed by a processor element, cause the processor element to: control projecting a light beam onto a projection surface, the projection surface comprising a holographic optical element (HOE) centered at a first location; control projecting an image onto a location shifted from the first location based on a misalignment of a user's line of sight with the first location; and control reflecting the image from the HOE to a first exit pupil.

Example 30

The non-transitory machine-readable storage medium of Example 29, the misalignment of the user's line of sight with the first location determined based on a difference between the user's interpupillary distance (IPD) and an IPD represented by the first location of the HOE.

Example 31

The non-transitory machine-readable storage medium of Example 29, an amount of shift of the image from the first location determined based on a selection signal indicating an image location at which the user's line of sight is aligned with at least the image.

Example 32

The non-transitory machine-readable storage medium of Example 31, wherein the selection signal is generated by a control device.

Example 33

The non-transitory machine-readable storage medium of Example 32, wherein the selection signal is generated based on tracking of the user's line of sight.

Example 34

The non-transitory machine-readable storage medium of Example 29, wherein the shift of the image from the first location is in at least one of a horizontal direction or vertical direction relative to the first location.

Example 35

The non-transitory machine-readable storage medium of Example 30, wherein the IPD represented by the first location of the HOE is received from a control device.

Example 36

The non-transitory machine-readable storage medium of Example 31, wherein the selection signal is generated in response to a control input by a user.

Example 37

The non-transitory machine-readable storage medium of Example 29, comprising instructions that, when executed by the processor element, cause the processor element to: control emitting the light beam from a light source; control receiving the light beam at a mirror; and control rotating the mirror to scan the light beam onto the projection surface.

Example 38

The non-transitory machine-readable storage medium of Example 29, wherein the projection surface is a first projection surface and the HOE is a first holographic optical combiner, the non-transitory machine-readable storage medium comprising instructions that, when executed by the processor element, cause the processor element to: control projecting a light beam onto a second projection surface, the second projection surface comprising a second HOE centered at a second location; control projecting an image onto a location shifted from the second location based on a misalignment of the user's line of sight with the second location; and control reflecting the image from the HOE to a second exit pupil.

Example 39

The non-transitory machine-readable storage medium of Example 38, wherein the first location corresponds to a first IPD and the second location corresponds to a second IPD different than the first IPD.

Example 40

An apparatus, comprising: a projection surface means to receive light, the projection surface means comprising a holographic optical element (HOE) centered at a first location; a projection means to project light onto a projection area comprising at least a portion of the projection surface means comprising the HOE; and a control means to send a control signal to the projection means to cause the projection means to project an image onto a location shifted from the first location based on a misalignment of a user's line of sight with the first location.

Example 41

The apparatus of Example 40, the misalignment of the user's line of sight with the first location determined based on a difference between the user's interpupillary distance (IPD) and an IPD represented by the first location of the HOE.

Example 42

The apparatus of Example 40, an amount of shift of the image from the first location determined based on a selection signal indicating an image location at which the user's line of sight is aligned with at least the image.

Example 43

The apparatus of Example 40, comprising a frame, the projection means coupled to the frame and the projection surface means removably coupled to the frame.

Example 44

The apparatus of Example 43, wherein the projection surface means is a first projection surface means and the HOE is a first HOE, the frame to removably receive a second projection surface means to receive light, the second projection surface means comprising a second HOE centered at a second location on the second projection surface means.

Example 45

The apparatus of Example 44, the control means to: receive an information element to include an indication of the first location or the second location; and send a control signal to the projection means, based on the information element, to cause the projection means to project an image onto one of (i) a location shifted from the first location based on a misalignment of the user's line of sight with the first location, or (ii) a location shifted from a second location based on a misalignment of the user's line of sight with the second location.

Example 46

The apparatus of Example 45, wherein (i) the shift of the image from the first location is in at least one of a horizontal direction or vertical direction relative to the first location, or (ii) the shift of the image from the second location is in at least one of a horizontal direction or vertical direction relative to the second location.

Example 47

The apparatus of Example 45, wherein (i) the misalignment of the user's line of sight with the first location is determined based on a difference between the user's interpupillary distance (IPD) and an IPD represented by the first location of the first HOE, or (ii) the misalignment of the user's line of sight with the second location is determined based on a difference between the user's interpupillary distance (IPD) and an IPD represented by the second location of the second HOE.

Example 48

The apparatus of Example 40, wherein the shift of the image from the first location is in at least one of a horizontal direction or vertical direction relative to the first location.

Example 49

The apparatus of Example 2, wherein the IPD represented by the first location of the HOE is received from a control device.

Example 50

The apparatus of Example 2, wherein the shift of the image from the first location is in at least one of a horizontal direction or vertical direction relative to the first location.

Example 51

The apparatus of Example 3, wherein the selection signal is generated in response to a control input by a user.

Example 52

The apparatus of Example 3, wherein the shift of the image from the first location is in at least one of a horizontal direction or vertical direction relative to the first location.

Example 53

The apparatus of Example 1, wherein the projection surface is a glasses lens, a goggle lens, or a helmet visor, and wherein the frame is glasses, goggles, or a helmet.

What is claimed is:

1. An apparatus, comprising:
a projection surface, the projection surface comprising a holographic optical element (HOE) centered at a first location;
a projector to project light onto a projection area comprising at least a portion of the projection surface comprising the HOE; and
a controller to send a control signal to the projector to cause the projector to project an image onto a location shifted from the first location based on a misalignment of a user's line of sight with the first location,
wherein the misalignment of the user's line of sight with the first location is determined based on a difference between the user's interpupillary distance (IPD) and an IPD represented by the first location of the HOE.

2. The apparatus of claim 1, an amount of shift of the image from the first location determined based on a selection signal indicating an image location at which the user's line of sight is aligned with at least the image.

3. The apparatus of claim 1, comprising a frame, the projector coupled to the frame and the projection surface removably coupled to the frame.

4. The apparatus of claim 3, wherein the projection surface is a first projection surface and the HOE is a first HOE, the frame to removably receive a second projection surface, the second projection surface comprising a second HOE centered at a second location on the second projection surface.

5. The apparatus of claim 4, the controller to: receive an information element to include an indication of the first location or the second location; and send a control signal to the projector, based on the information element, to cause the projector to project an image onto one of (i) the location shifted from the first location based on the misalignment of the user's line of sight with the first location, or (ii) a location shifted from a second location based on a misalignment of the user's line of sight with the second location.

6. The apparatus of claim 5, wherein (i) the shift of the image from the first location is in at least one of a horizontal direction or vertical direction relative to the first location, or (ii) the shift of the image from the second location is in at least one of a horizontal direction or vertical direction relative to the second location.

7. The apparatus of claim 5, wherein the misalignment of the user's line of sight with the second location is determined based on a difference between the user's interpupillary distance (IPD) and an IPD represented by the second location of the second HOE.

8. The apparatus of claim 1, wherein the shift of the image from the first location is in at least one of a horizontal direction or vertical direction relative to the first location.

9. A system for projecting an image, the system comprising:
a frame to removably receive a first one of a plurality of projection surfaces, each of the plurality of projection surfaces comprising a holographic optical element (HOE) centered at a reference location; and
a projection system coupled to the frame, the projection system comprising:
a projector to project light onto a first one of the plurality of projection surfaces; and
a controller to send a control signal to the projector to cause the projector to project an image onto a location shifted from the reference location of the HOE of the first one of the projection surfaces based on a misalignment of a user's line of sight with the reference location of the HOE;
wherein the misalignment of the user's line of sight with the reference location of the HOE is determined based on a difference between the user's interpupillary distance (IPD) and an IPD represented by the reference location of the HOE of the first one of the projection surfaces.

10. The system of claim 9, the frame to removably receive a second one of the plurality of projection surfaces.

11. The system of claim 10, the controller to receive an information element to include an indication of the first one of the plurality of projection surfaces or the second one of the plurality of projection surfaces.

12. The system of claim 11, the controller to send a control signal to the projector, based on the information element, to cause the projector to project an image onto one of (i) the location shifted from the reference location of the HOE of the first one of the projection surfaces based on the misalignment of the user's line of sight with the reference location of the HOE of the first one of the projection surfaces, or (ii) a location shifted from the reference location of the HOE of the second one of the projection surfaces based on a misalignment of the user's line of sight with the reference location of the HOE of the second one of the projection surfaces.

13. The system of claim 12, wherein the misalignment of the user's line of sight with the reference location of the HOE of the second one of the projection surfaces is determined based on a difference between the user's interpupillary distance (IPD) and an IPD represented by the reference location of the HOE of the second one of the projection surfaces.

14. The system of claim 12, wherein (i) the shift of the image from the reference location of the HOE of the first one of the projection surfaces is in at least one of a horizontal direction or vertical direction relative to the reference location of the HOE of the first one of the projection surfaces, or (ii) the shift of the image from the reference location of the HOE of the second one of the projection surfaces is in at least one of a horizontal direction or vertical direction relative to the reference location of the HOE of the second one of the projection surfaces.

15. The system of claim 12, the reference location of the HOE of the first one of the plurality of projection surfaces offset from the reference location of the HOE of the second one of the plurality of projection surfaces.

16. The system of claim 10, wherein each of the plurality of projection surfaces is a glasses lens, a goggle lens, or a helmet visor, and wherein the frame is glasses, goggles, or a helmet.

17. A method to project a virtual image, the method comprising:
projecting a light beam onto a projection surface, the projection surface comprising a holographic optical element (HOE) centered at a first location;
projecting an image onto a location shifted from the first location based on a misalignment of a user's line of sight with the first location; and
reflecting the image from the HOE to a first exit pupil, wherein the misalignment of the user's line of sight with the first location determined based on a difference between the user's interpupillary distance (IPD) and an IPD represented by the first location of the HOE.

18. The method of claim 17, an amount of shift of the image from the first location determined based on a selection signal indicating an image location at which the user's line of sight is aligned with at least the image.

19. The method of claim 18, wherein the selection signal is generated by a control device.

20. The method of claim 18, wherein the selection signal is generated based on tracking of the user's line of sight.

21. The method of claim 17, wherein the shift of the image from the first location is in at least one of a horizontal direction or vertical direction relative to the first location.

22. The method of claim 17, wherein the projection surface is a first projection surface and the HOE is a first holographic optical combiner, the method comprising:
projecting a light beam onto a second projection surface, the second projection surface comprising a second HOE centered at a second location;
projecting an image onto a location shifted from the second location based on a misalignment of the user's line of sight with the second location; and
reflecting the image from the HOE to a second exit pupil.

23. The method of claim 22, wherein the first location corresponds to a first IPD and the second location corresponds to a second IPD different than the first IPD.

* * * * *